US009390402B1

(12) United States Patent
Kane, Jr. et al.

(10) Patent No.: US 9,390,402 B1
(45) Date of Patent: Jul. 12, 2016

(54) COLLECTION OF PROGRESS DATA

(75) Inventors: Francis J. Kane, Jr., Sammamish, WA (US); Tom Killalea, Seattle, WA (US); Llwellyn J. Mason, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 374 days.

(21) Appl. No.: 12/495,351

(22) Filed: Jun. 30, 2009

(51) Int. Cl.
*G06F 15/16* (2006.01)
*G06Q 10/10* (2012.01)
*G06Q 30/02* (2012.01)
*G06Q 30/06* (2012.01)

(52) U.S. Cl.
CPC .......... *G06Q 10/101* (2013.01); *G06Q 30/0241* (2013.01); *G06Q 30/0645* (2013.01)

(58) Field of Classification Search
None
See application file for complete search history.

(56) References Cited

U.S. PATENT DOCUMENTS

| | | | |
|---|---|---|---|
| 5,583,763 A | 12/1996 | Atcheson et al. | |
| 5,986,690 A | 11/1999 | Hendricks | |
| 6,016,475 A * | 1/2000 | Miller et al. | 705/7.29 |
| 6,266,649 B1 | 7/2001 | Linden et al. | |
| 6,526,411 B1 | 2/2003 | Ward | |
| 6,782,370 B1 | 8/2004 | Stack | |
| 6,807,417 B2 | 10/2004 | Sallinen et al. | |
| 6,905,340 B2 | 6/2005 | Stansvik | |
| 6,912,505 B2 | 6/2005 | Linden et al. | |
| 6,947,922 B1 | 9/2005 | Glance | |
| 6,963,838 B1 | 11/2005 | Christfort | |
| 7,065,047 B2 | 6/2006 | Boxall et al. | |
| 7,103,848 B2 | 9/2006 | Barsness et al. | |
| 7,412,442 B1 | 8/2008 | Vadon et al. | |
| 7,428,411 B2 | 9/2008 | Zellner | |
| 7,523,191 B1 | 4/2009 | Thomas et al. | |
| 7,533,082 B2 | 5/2009 | Abbott et al. | |
| 7,542,951 B1 | 6/2009 | Chakrabarti et al. | |
| 7,552,068 B1 | 6/2009 | Brinkerhoff | |
| 7,562,185 B2 | 7/2009 | Matsuda et al. | |
| 7,730,216 B1 | 6/2010 | Issa et al. | |
| 7,860,895 B1 | 12/2010 | Scofield et al. | |
| 7,867,094 B1 | 1/2011 | Wisdom et al. | |
| 8,041,657 B1 | 10/2011 | Nguyen et al. | |
| 8,060,525 B2 | 11/2011 | Svendsen et al. | |
| 8,117,193 B2 | 2/2012 | Svendsen et al. | |
| 8,219,071 B2 | 7/2012 | Kokubo et al. | |
| 8,510,247 B1 | 8/2013 | Kane, Jr. et al. | |
| 8,666,538 B2 | 3/2014 | Deas et al. | |
| 2001/0037360 A1 | 11/2001 | Ekkel | |
| 2002/0055089 A1 | 5/2002 | Scheirer | |

(Continued)

FOREIGN PATENT DOCUMENTS

WO   WO2009071736 A1   6/2009

OTHER PUBLICATIONS

Johnson, "How the E-Book Will Change the Way We Read and Write", The Wall Street Journal, Apr. 20, 2009, retrieved from the Internet at http://online.msj.com/article/SB123980920727621353.html#printMode.

(Continued)

*Primary Examiner* — Scott B Christensen
(74) *Attorney, Agent, or Firm* — Lee & Hayes, PLLC

(57) ABSTRACT

User content access events pertaining to a content item, such as an e-book, audio, video file, and so on, are collected and analyzed to determine progress data, including abandonment information about when the content item, or a portion thereof, has been abandoned. Once determined, recommendations may be presented based on progress data from similar users.

35 Claims, 19 Drawing Sheets

(56) References Cited

U.S. PATENT DOCUMENTS

| | | |
|---|---|---|
| 2002/0120635 A1 | 8/2002 | Joao |
| 2003/0028889 A1 | 2/2003 | McCoskey et al. |
| 2003/0046678 A1 | 3/2003 | Boxall et al. |
| 2003/0093275 A1 | 5/2003 | Polanyi et al. |
| 2003/0210226 A1 | 11/2003 | Ho et al. |
| 2004/0039593 A1 | 2/2004 | Eskandari |
| 2004/0199527 A1* | 10/2004 | Morain et al. ............ 707/100 |
| 2004/0201633 A1* | 10/2004 | Barsness et al. ............ 345/864 |
| 2004/0215733 A1 | 10/2004 | Gondhalekar et al. |
| 2005/0006154 A1 | 1/2005 | Back et al. |
| 2005/0027671 A1 | 2/2005 | Hind et al. |
| 2005/0069849 A1 | 3/2005 | McKinney et al. |
| 2005/0113650 A1 | 5/2005 | Pacione et al. |
| 2005/0114694 A1 | 5/2005 | Wager et al. |
| 2006/0020973 A1 | 1/2006 | Hannum et al. |
| 2006/0047644 A1* | 3/2006 | Bocking et al. ............ 707/4 |
| 2006/0136393 A1 | 6/2006 | Abbott et al. |
| 2006/0143133 A1 | 6/2006 | Medvinsky |
| 2006/0266830 A1 | 11/2006 | Horozov et al. |
| 2006/0271552 A1 | 11/2006 | McChesney et al. |
| 2006/0271618 A1 | 11/2006 | Kokubo et al. |
| 2007/0027852 A1 | 2/2007 | Howard et al. |
| 2007/0028266 A1 | 2/2007 | Trajkovic et al. |
| 2007/0055926 A1 | 3/2007 | Christiansen et al. |
| 2007/0124046 A1 | 5/2007 | Ayoub et al. |
| 2007/0168892 A1 | 7/2007 | Brush et al. |
| 2007/0203763 A1 | 8/2007 | Ackley et al. |
| 2007/0204223 A1 | 8/2007 | Bartels et al. |
| 2007/0204308 A1 | 8/2007 | Nicholas et al. |
| 2007/0219949 A1 | 9/2007 | Mekikian |
| 2007/0266002 A1* | 11/2007 | Chowdhury et al. ............ 707/2 |
| 2008/0016205 A1 | 1/2008 | Svendsen |
| 2008/0057924 A1 | 3/2008 | Stewart |
| 2008/0059422 A1 | 3/2008 | Tenni et al. |
| 2008/0092244 A1 | 4/2008 | Lee |
| 2008/0189733 A1 | 8/2008 | Apostolopoulos |
| 2008/0195664 A1 | 8/2008 | Maharajh et al. |
| 2008/0201348 A1 | 8/2008 | Edmonds et al. |
| 2008/0201643 A1 | 8/2008 | Nagaitis et al. |
| 2008/0263014 A1 | 10/2008 | Garijo Mazario et al. |
| 2008/0294584 A1 | 11/2008 | Herz |
| 2008/0301737 A1 | 12/2008 | Hjelmeland Almas et al. |
| 2008/0313040 A1 | 12/2008 | Rose et al. |
| 2009/0085803 A1 | 4/2009 | Mergen |
| 2009/0113532 A1 | 4/2009 | Lapidous |
| 2009/0133059 A1 | 5/2009 | Gibbs et al. |
| 2009/0150489 A1 | 6/2009 | Davis et al. |
| 2009/0150501 A1 | 6/2009 | Davis et al. |
| 2009/0157899 A1* | 6/2009 | Gagliardi et al. ............ 709/235 |
| 2009/0164429 A1 | 6/2009 | Svendsen et al. |
| 2009/0164641 A1* | 6/2009 | Rogers et al. ............ 709/227 |
| 2009/0177745 A1 | 7/2009 | Davis et al. |
| 2009/0213001 A1 | 8/2009 | Appelman et al. |
| 2009/0216623 A1 | 8/2009 | Hendricks et al. |
| 2009/0228126 A1 | 9/2009 | Spielberg et al. |
| 2009/0248833 A1 | 10/2009 | Frazier |
| 2009/0254409 A1 | 10/2009 | Kozhukh |
| 2009/0254529 A1 | 10/2009 | Goldentouch |
| 2009/0265750 A1 | 10/2009 | Jones et al. |
| 2009/0271514 A1 | 10/2009 | Thomas et al. |
| 2009/0281851 A1 | 11/2009 | Newton et al. |
| 2010/0056183 A1 | 3/2010 | Oh |
| 2010/0076274 A1 | 3/2010 | Severson |
| 2010/0082376 A1 | 4/2010 | Levitt |
| 2010/0088746 A1 | 4/2010 | Kota et al. |
| 2010/0106263 A1 | 4/2010 | Charania |
| 2010/0121777 A1 | 5/2010 | Mcgonigal et al. |
| 2010/0146091 A1 | 6/2010 | Curtis et al. |
| 2010/0205541 A1 | 8/2010 | Rapaport et al. |
| 2010/0223273 A1 | 9/2010 | Schneider |
| 2010/0251304 A1 | 9/2010 | Donoghue et al. |
| 2010/0313161 A1 | 12/2010 | Le Chevalier et al. |
| 2010/0333137 A1 | 12/2010 | Hamano et al. |
| 2011/0060807 A1 | 3/2011 | Martin et al. |
| 2011/0106736 A1 | 5/2011 | Aharonson et al. |
| 2011/0320380 A1 | 12/2011 | Zahn et al. |
| 2012/0297466 A1 | 11/2012 | Li |
| 2013/0046823 A1 | 2/2013 | Mitchell et al. |
| 2013/0067357 A1 | 3/2013 | Rose |
| 2013/0144968 A1 | 6/2013 | Berger |
| 2013/0173467 A1 | 7/2013 | Nuzzi et al. |
| 2013/0174223 A1 | 7/2013 | Dykeman et al. |
| 2013/0244624 A1 | 9/2013 | Das; Saumitra Mohan; et al. |
| 2015/0066648 A1 | 3/2015 | Kane, JR.; Francis J.; |

OTHER PUBLICATIONS

Li et al., "Shopping Cart Abandonment at Retail Websites—A Multi-Stage Model of Online Shopping Behavior", Feb. 16, 2005, pp. 1-50.

Final Office Action for U.S. Appl. No. 12/495,256, mailed on Jan. 27,2012, Francis J. Kane Jr et al., "Recommendations Based on Progress Data", 29 pages.

Non-Final Office Action for U.S. Appl. No. 12/495,256, mailed on Sep. 19, 2011, Francis J. Kane Jr, "Recommendations Based on Progress Data", 24 pages.

"KidsWatch Time Limit Parental Control Web Filtering Software", retrieved on Oct. 29, 2013 at <<http://web.archive.org/web/20081217080426/http://kidswatch.com/Time-Limit-Controls.php>>, Computer Time Limits, Webarchive, Dec. 17, 2008, 2 pages.

Office Action for U.S. Appl. No. 12/495,256, mailed on Jan. 30, 2014, Francis J. Kane, Jr., "Recommendations Based on Progress Data", 25 pages.

Office Action for U.S. Appl. No. 12/570,690, mailed on Feb. 4, 2014, Hilliard B. Siegel, "Dynamic Access to Content Items Based on Venue", 63 pages.

Office Action for U.S. Appl. No. 12/495,061, mailed on Feb. 5, 2014, Francis J. Kane Jr., "Content Usage Analysis and Recommendations", 32 pages.

Final Office Action for U.S. Appl. No. 13/962,809, mailed on Mar. 24, 2014, Francis J. Kane Jr, "Recommendation of Media Content Items Based on Geolocation and Venue", 41 pages.

Response to Office Action dated Nov. 21, 2011 for U.S. Appl. No. 12/495,061, filed Feb. 21, 2013, 19 pages.

Response to Office Action dated Nov. 6, 2012 for U.S. Appl. No. 12/495,009, filed Mar. 6, 2013, 15 pages.

Response to Office Action dated Feb. 13, 2012 for U.S. Appl. No. 12/495,009, filed Jul. 13, 2012, 26 pages.

Non-Final Office Action for U.S. Appl. No. 12/495,061, mailed on May 24, 2012, Francis J. Kane Jr.et al., "Content Usage Analysis and Recommendations", 16 pages.

Non-Final Office Action for U.S. Appl. No. 12/495,179, mailed on May 24, 2012, Francis J. Kane Jr et al., "Reporting of Content Consumption Progress to Content Purveyors", 42 pages.

"Boeing couldn't make a business out of in-flight Internet. AirCell bets it can." Alsever, <<http://money.cnn.com/2007/11/19/smbusiness/wi-fi.fsb/index.htm>>, available as early as Nov. 28, 2007, 2 pages.

"Boeing Selects ScreamingMedia to Supply Online Content to Airborne Travelers," ScreamingMedia Inc., <<http://web.archive.org/web/20010509195703/www01.screamingmedia.com/en/about_us/pr . . .>> received on Apr. 14, 2009, 2 pages.

"Boeing Signs With ScreamingMedia for In-Flight Web Access," Tischelle George, Information Week, <<http://www.informationweek.com/news/showArticle.jhtml?articleID=6505757>> available as early as May 7, 2001, 1 page.

"cyberPIXIE offers the most comprehensive solutions available in the market for your high-speed wireless LAN needs," cyberPIXIE, Inc., <<http://web.archive.org/web/20020604074928/http:/cyberpixie.com/>> available as early as May 22, 2002, 6 pages.

Espinoza et al., "GeoNotes: Social and Navigational Aspects of Location-Based Information Systems," Springer-Verlag Berlin Heidelberg 2001, Ubicomp 2001, LNCS 2201, pp. 2-17.

Office action for U.S. Appl. No. 12/570,690, mailed on Nov. 26, 2012, Siegel et al., "Dynamic Access to Content Items Based on Venue," 28 pages.

Non-Final Office Action for U.S. Appl. No. 12/495, 009, mailed on Feb. 13, 2012, Francis J. Kane Jr. et al., "Recommendation of Media Content Items Based on Geolocation and Venue," 35 pages.

(56) References Cited

OTHER PUBLICATIONS

"PCTEL Acquires Wireless LAN Software and Gateway Products," PCTEL, Inc. <<http://web.archive.org/web/20020607225950/www.pctel.com/newsroom/2002/02-05-22.html>>, available as early as May 22, 2002, 2 pages.

"Wireless internet access in-flight, along with complimentary access to the Wall Street Journal, Fodors, etc. while in flight," 2009 Aircell, <<http://www.gogoinflight.com/>> received on Apr. 14, 2009, 2 pages.

Final Office Action for U.S. Appl. No. 12/495,061, mailed on May 28, 2014, Francis J. Kane, Jr., "Content Usage Analysis and Recommendations", 31 pages.

Final Office Action for U.S. Appl. No. 12/495,256, mailed on Jun. 5, 2014, Francis J. Kane Jr., "Recommendations Based on Progress Data", 18 pages.

Brunato, et al., "A Location-Dependent Recommender System for the Web", Technical report DIT-02-0093, Universita di Trento, Nov. 2002, pp. 1-8.

Cataldo, "LS on basic and advanced services examples", Technical Specification Group Services and System Aspects Meeting #11, Palm Springs, CA, USA, Mar. 19-22, 2001, 11 pages.

Funk, "The future of mobile shopping: The interaction between lead users and technological trajectories in the Japanese market", Technological Forecasting and Social Change 74, ScienceDirect, Elsevier, pp. 341-356.

Hampton, "Neighborhoods in the Network Society the e-Neighbors Study", Information, Communication & Society, vol. 10, No. 5, Oct. 2007, pp. 714-748.

Lee, et al., "A time-based approach to effective recommender systems using implicit feedback", Expert Systems with Applications 34, ScienceDirect, Elsevier, vol. 34, Issue 4, May 2008, pp. 3055-3062.

Lee, et al., "A Time-based Recommender System using Implicit Feedback", Proceeding of Proceedings of the 2006 International Conference on E-Learning, E-Business, Enterprise Information Systems, E-Government & Outsourcing, Las Vegas, Nevada, USA, Jun. 26-29, 2006, 8 pages.

Li, et al, "Mining User Similarity Based on Location History", ACM GIS '08, Nov. 5-7, 2008, Irvine, CA, USA, 10 pages.

Miura, et al., "Adequate RSSI Determination Method by Making Use of SVM for Indoor Localization", KES 2006, Part II, LNAI 4252, Springer-Verlag Berlin Heidelberg 2006, pp. 628-636.

Office Action for U.S. Appl. No. 13/962,809, mailed on Nov. 8, 2013, Francis J. Kane Jr., "Recommendation of Media Content Items Based on Geolocation and Venue", 25 pages.

Park, et al., "Location-Based Recommendation System Using Bayesian User's Preference Model in Mobile Devices", UIC 2007, LNCS 4611, Springer-Verlag Berlin Heidelberg 2007, pp. 1130-1139.

Parle, et al., "Proximo, Location-Aware Collaborative Recommender", UCD School of Conputer Science & Informatics University College Dublin, Belfield, Dublin, Ireland, 2006, pp. 1-6.

Wu, et al., "Development of a tool for selecting mobile shopping site: A customer perspective", Electronic Commerce Research and Applications, ScienceDirect, Elsevier, 2006, pp. 192-200.

Yang, et al., "A location-aware recommender system for mobile shopping environments", Expert Systems with Applications 34, ScienceDirect, Elsevier, 2008, pp. 437-445.

Final Office Action for U.S. Appl. No. 12/495,009, mailed on Nov. 6, 2012, Francis J. Kane Jr. et al., "Recommendation of Media Content Items Based on Geolocation and Venue", 12 pages.

Office action for U.S. Appl. No. 12/495,179, mailed on Feb. 21, 2013, Kane, Jr. et al., "Reporting of Content Consumption Progress to Content Purveyors", 65 pages.

Office action for U.S. Appl. No. 12/570,690, mailed on Jul. 15, 2013, Siegel et al., "Dynamic Access to Content Items Based on Venue", 62 pages.

Office action for U.S. Appl. No. 12/495,061, mailed on Nov. 21, 2012, Kane, Jr. et al., "Content Usage Analysis and Recommendations," 24 pages.

Office Action for U.S. Appl. No. 12/495,256, mailed on Jan. 12, 2015, Francis J. Kane, Jr., "Recommendations Based on Progress Data", 21 pages.

Office action for U.S. Appl. No. 12/495,061, mailed on Oct. 7, 2014, Kane, Jr., et.al., "Content Usage Analysis and Recommendations", 52 pages.

Office Action for U.S. Appl. No. 12/495,179, Francis J. Kane Jr, "Reporting of Content Consumption Progress to Content Purveyors", 60 pages.

Final Office Action U.S. Appl. No. 12/570,690, mailed on Mar. 12, 2015, Hilliard B. Siegel, "Dynamic Access to Content Items Based on Venue", 86 pages.

Office Action for U.S. Appl. No. 13/461,244, mailed on Mar. 16, 2015, Joshua M. Goodspeed, "Location-Based Interaction with Digital Works", 18 pages.

Office Action for U.S. Appl. No. 12/570,690, mailed on Aug. 22, 2014, Hilliard B. Siegel, "Dynamic Access to Content Items Based on Venue", 70 pages.

Final Office Action for U.S. Appl. No. 12/495,179, mailed on Jul. 10, 2015, Francis J. Kane, Jr., "Reporting of Content Consumption Progress to Content Purveyors", 65 pages.

Office action for U.S. Appl. No. 12/495,061, mailed on Aug. 13, 2015, Kane, Jr. et al., "Content Usage Analysis and Recommendations", 58 pages.

Office action for U.S. Appl. No. 13/461,244, mailed on Dec. 17, 2015, Goodspeed et al., "Location-Based Interaction with Digital Works", 23 pages.

Office action for U.S. Appl. No. 14/537,483, mailed on Dec. 18, 2015, Kane, Jr. et al., "Recommendation of Media Content Items Based on Geolocation and Venue", 27 pages.

Office action for U.S. Appl. No. 13/461,244 mailed on Sep. 11, 2015, Goodspeed et al., "Location-Based Interaction with Digital Works", 21 pages.

\* cited by examiner

COLLECTION OF PROGRESS DATA

BACKGROUND

A large and growing population of users is consuming increasing amounts of digital content items, such as music, movies, audio books, electronic books, executables, and so on. These users employ various electronic access devices to consume such content items. Among these access devices are electronic book readers, cellular telephones, personal digital assistant (PDA), portable media players, tablet computers, netbooks, and the like. As more users consume content items electronically, new opportunities to observe how users interact with content may be discovered and explored. Such observations may enable users, as well as purveyors such as creators, authors, illustrators, editors, publishers, distributors, etc., to better understand how content items are consumed. For example, there is currently no mechanism to determine when users have ceased consuming content items, or otherwise abandoned them altogether, and feed this information back to users and purveyors of content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes an architecture and techniques in which user interaction with content items, and particularly abandonment of the content items, is tracked and analyzed. A content item may be essentially any form of an electronic data that may be consumed on a device, such as a digital book, electronic magazines, music, movies, and so on. A content item may also be composed of multiple smaller portions, such as units, chapters, sections, pages, tracks, episodes, parts, subdivisions, scenes, intervals, periods, modules, and so forth.

Users may access and present the content items through a wide variety of access devices, such as electronic book readers, cellular telephones, personal digital assistant (PDA), portable media players, tablet computers, and so forth. With the help of these devices, metrics pertaining to user progress through the content items may be collected, aggregated, and reported. In particular, these metrics may include abandonment data as to when users cease interacting with all or part of individual content items, such as which content items were abandoned by users and at what point they were abandoned.

These metrics provide insights into how user progress through content items, and why users abandoned the content items, or portions thereof. These insights may benefit users by providing more accurate recommendations for future items, based on matching a person's abandonment metrics with those of other users and drawing similarities. These recommendations may further include abandonment patterns for a content item based on other users, as well as probability estimates of how likely the user is to abandon a particular content item.

Collection of these metrics as well as the resulting statistics also improves user interaction with content items. A user may access and filter content items based on abandonment status, which might include, for example, content items not yet accessed (such as unread content items), items in progress (user is actively consuming), abandoned items (user no longer wishes to access), finished items, and so forth. In one implementation, abandonment status may be considered an estimation of a user's intent to, and/or likelihood of, resuming access to the content item.

For discussion purposes, the architecture and techniques are described in an online context where the content items are retrieved from remote servers and abandonment information is gathered via an online service. However, the concepts described herein are also applicable in other architectures where user interaction with content items is monitored and fed back for computation of abandonment metrics. For instance, aspects described herein may be performed in an offline environment.

Abandonment Collection and Recommendation Architecture

Figure 1:
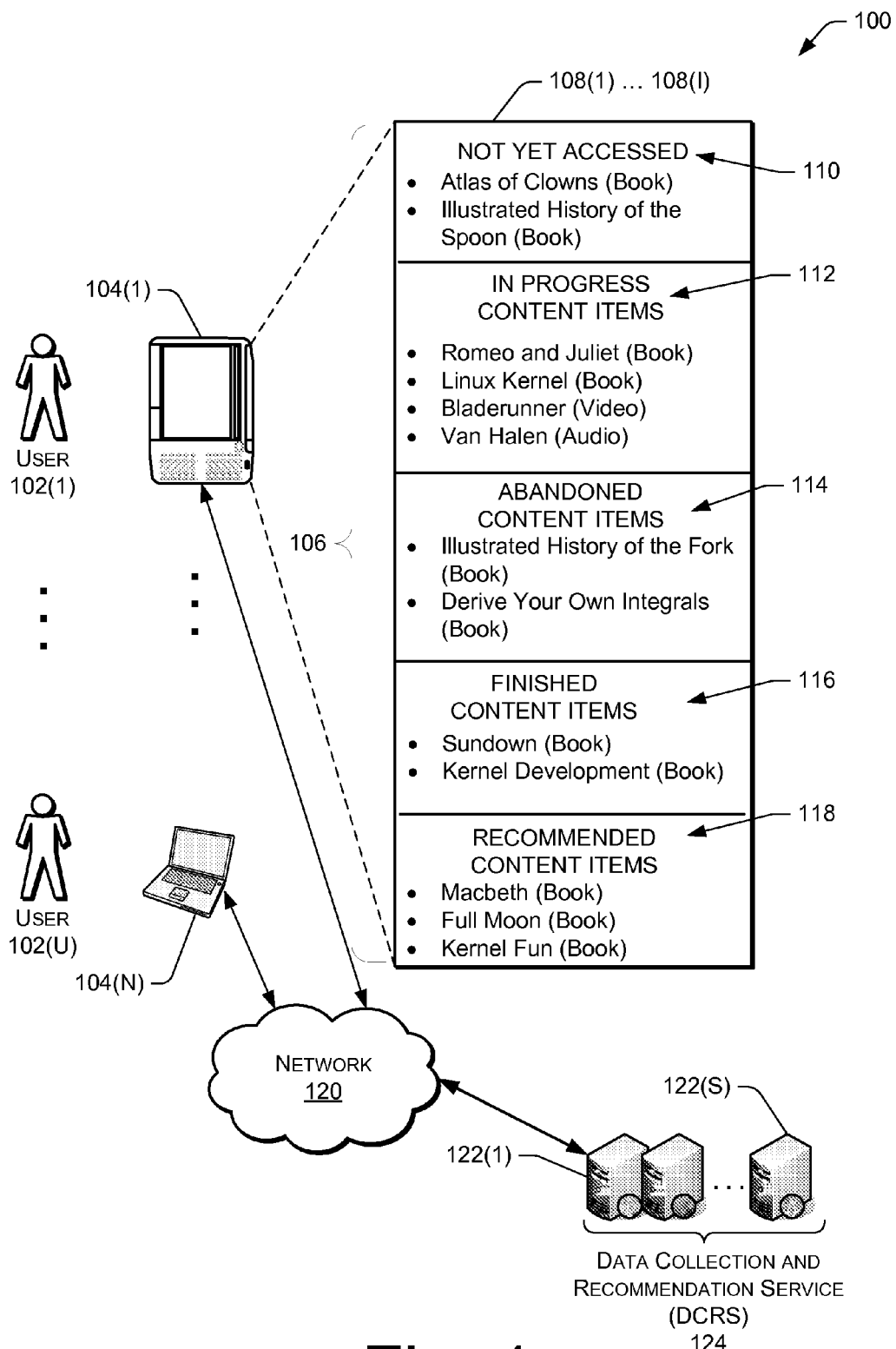
FIG. 1 is an illustrative architecture for collecting abandonment data and generating recommendations. The architecture includes many access devices that can be used to access content items as well as a server-based data collection and recommendation service (DCRS) to track and generate progress patterns and probabilities pertaining to user consumption of the content items. The DCRS may also generate reports and recommendations.

FIG. 1 shows an illustrative architecture 100 for tracking when users abandon certain content items. Users 102(1), . . . , 102(U) are part of a population of people, which may be a defined group of users (e.g., a club or group that involves registration or subscription) or an open ended collection of users (e.g., everyone visiting a media site). The users consume a wide variety of content items, such as books, magazines, music, movies, and so on. As used in this application, letters within parentheses, such as "(U)" or "(N)", connote any integer number greater than zero.

Each representative user 102(1)-(U) employs one or more corresponding electronic access devices 104(1), . . . , 104(N) to enable consumption of the content items. For instance, user 102(1) uses an electronic book ("eBook") reader device 104(1) to read digital textual material, such as electronic books, magazines, and the like. User 102(U) employs a laptop computer 104(N) to enjoy any number of content items, such as watching a movie, or listening to audio, or reading electronic text-based material. While these example devices are shown for purposes of illustration and discussion, it is noted that many other electronic devices may be used, such as laptop computers, cellular telephones, portable media players, tablet computers, netbooks, notebooks, desktop computers, gaming consoles, DVD players, media centers, and the like.

Each access device 104(1)-(N) stores or has access to one or more content items. Each device, as represented by eBook reader device 104(1), may maintain a listing 106 of content items 108(1) . . . (I). The listing 106 may be presented to the user on the display. In the illustrated example, the listing 106 includes five different classification sections of content items based on abandonment metrics: (1) a first section 110 that identifies content items that have not yet been accessed, such as the books "Atlas of Clowns" and "Illustrated History of the Spoon"; (2) a second section 112 for content items with access in progress, such as the partially read book "Romeo and Juliet" or a partially viewed video "Bladerunner"; (3) a third section 114 for abandoned content items, such as "Illustrated History of the Fork"; (4) a fourth section 116 for finished content items, such as the book "Sundown"; and (5) a fifth section 118 for recommended content items, such as the books "Full Moon" and "Kernel Fun."

A content item may be considered abandoned when one or more conditions are satisfied. There are many ways to determine when abandonment of all or a portion of a content item occurs. For example, a content item 108 may be deemed abandoned when there is significant time lag since the user last accessed the content item 108 (e.g., a time since last access exceeds a threshold), or when the content item 108 has been removed from local storage on access device 104, or when other types of conditions are met that would suggest the user no longer intends to return to the content item. Abandoned content items may also include content items that are sold or otherwise transferred to another person or entity or when the user's lease of the content items has lapsed. The determination of abandonment is discussed in more detail below with reference to FIGS. 16-18.

The access devices 104(1)-(N) may be configured with functionality to access a network 120 and download content items from remote sources, such as remote servers 122(1), 122(2), . . . , 122(S). Network 120 may be any type of communication network, including the Internet, a local area network, a wide area network, a wireless wide area network (WWAN), a cable television network, a wireless network, a telephone network, etc. Network 120 allows communicative coupling between access devices 104(1)-(N) and remote servers, such as network resource servers 122(1)-(S). Of particular note, individual ones of the access devices 104(1)-(N), such as eBook reader device 104(1), may be equipped with a wireless communication interface that allows communication with the servers 122 over a wireless network. This allows information collected by the eBook reader device 104(1) (or other access devices) pertaining to consumption of content items to be transferred over the network 120 to the remote servers 122(1)-(S).

The network resource servers 122(1)-(S) may store or otherwise have access to content items that can be presented on the access devices 104(1)-(N). The servers 122(1)-(S) collectively have processing and storage capabilities to receive requests for content items and to facilitate purchase and/or delivery of those content items to the access devices 104(1)-(N). In some implementations, the servers 122(1)-(S) store the content items, although in other implementations, the servers merely facilitate data collection, recommendation, access to, purchase, and/or delivery of those content items. The servers 122(1)-(S) may be embodied in any number of ways, including as a single server, a cluster of servers, a server farm or data center, and so forth, although other server architectures (e.g., mainframe) may also be used.

Alternatively, the content items may be made available to the access devices 104(1)-(N) through offline mechanisms. For instance, content items may be preloaded on the devices, or the content items may be stored on portable media that can be accessed by the devices. For instance, electronic books and/or magazines may be delivered on portable storage devices (g., flash memory) that can be accessed and played by the access devices.

Network resource servers 122(1)-(S) may be configured to host a data collection and recommendation service (DCRS) 124. Computing devices (e.g., access devices 104 as well as other computing equipment (not shown) such as servers, desktops, thin clients, etc.) may access the DCRS 124 via the network 120. The DCRS 124 collects data pertaining to user interaction with the content items, which is generally referred to as content access events. The DCRS 124 may be configured to receive such data from access devices 104, or otherwise capture data indicative of an access device's attempts to access or consume the content items (e.g., monitoring activities that may involve accessing remote servers to access and consume the content items). The DCRS 124 then processes the content access events, uses them to derive progress data, including abandonment information (e.g., patterns, probabilities, etc.), and generate recommendations based on the progress data and abandonment information. The recommendations may be generated for a particular user, or for a group of users.

Further, the DCRS 124 may provide analysis, reporting, and recommendations to users 102 as well as others such as content purveyors such as publishers, authors, distributors, librarians, purchasing agents, etc. The DCRS 124 can push the recommendations to users 102, or alternatively provide the recommendations in response to intentional user requests. Content purveyors may use abandonment information and recommendations to select, modify, or otherwise better manage their content items 108(1)-(I) which are accessible to users 102(1)-(U) via access devices 104(1)-(N). Abandonment reporting is discussed in a co-pending application filed concurrently herewith, and titled "Reporting of Abandonment to Content Purveyors."

In one example of this architecture in use, suppose a user 102(1) is reading contemporaneously several books on her electronic book reader 104(1). The user 102(1) may be currently reading a book titled "Linux Kernel" for job-related reasons, previously read the book "The Illustrated History of the Fork" for a college class, and recently finished a recreational book entitled "Sundown." During this time, the access devices 104(1)-(N) are recording data about user interaction with the various books as content access events (CAEs) and feeding the CAEs over the network 120 to the DCRS 124 for collection and analysis.

For the first book, suppose the user 102(1) found that not all of the portions of "Linux Kernel" were pertinent to the needs of work, and thus quickly read only a few pages in each chapter to get a sense of the content before skipping to the next chapter. In this case, since the user 102(1) is in process of reading through most if not all chapters, the particular content item is classified in the "in progress content items" section 112 of the listing 106.

Next, for the second book mentioned above, suppose an instructor for the college class only assigned specific chapters of the "Illustrated History of the Fork" to the students, including the user 102(1). Further, suppose that the user 102(1) only accessed those chapters during very brief sessions, typically 15-20 minutes before class was scheduled to start. Notably, an illustrated diagram of the evolution of the fork contained in the book was referenced by her over 57 times. Upon completion of the class, the user 102(1) lost all interest in cutlery, and stopped reading the book, thus abandoning the book before having finished it entirely. Having been deemed abandoned, the content item is assigned to the "abandoned content items" section 114 of the listing 106.

In contrast, with the third book, the user 102(1) spent several hours per day reading "Sundown." In particular, she first read, in a single reading session that extended long into the night, two lengthy chapters positioned in the middle of the book that involved a dramatic rescue. After reading the entire book, the content item was given a finished status and placed in the "finished content items" section 116 of the listing 106.

Based on such abandonment behavior, the user 102(1) may receive recommendations for other content items. For example, the sequel to "Sundown" entitled "Full Moon" may be recommended based on the completion of "Sundown." While user 102(1) has not yet finished "Linux Kernel", a recommendation to particular chapters in another book titled "Kernel Fun" may be offered. This recommendation of particular chapters may be based on an analysis of other users who exhibited similar behavior with respect to the book "Linux Kernel", and other books or chapters thereof that they also read. In addition to using similar behavior of other users, recommendations may be based on other techniques, such as item-to-item similarity mappings, various clustering techniques, viewing histories, purchase histories, and so forth.

For instance, the user 102(1) may also receive recommendations based on content items which have previously been purchased. For example, perhaps the user 102(1) purchased the book "Illustrated History of the Spoon" for the follow up college course that had previously required the book "Illustrated History of the Fork." Based on the abandonment of many sections by similar users, recommendations may be presented to the user 102(1) to focus reading to particular portions of the work, based on the access path and metrics of similar users. For more information on such techniques, the reader is directed to the following three issued patents: U.S. Pat. No. 6,266,649 entitled "Collaborative Recommendations Using Item-to-Item Similarity Mappings"; U.S. Pat. No. 6,912,505 entitled "Use of Product Viewing Histories of Users to Identify Related Products"; and U.S. Pat. No. 7,412,442 entitled "Identifying Items Relevant to a Keyword".

While this particular example is given in the context of reading books, it is noted that the example is merely for discussion purposes and not intended to be limited to books. Rather, as noted above, abandonment status may be ascertained for other content items, such as videos or music, and then be provided to the user or employed to make recommendations of other video or music selections.

Exemplary Access Device

Figure 2:
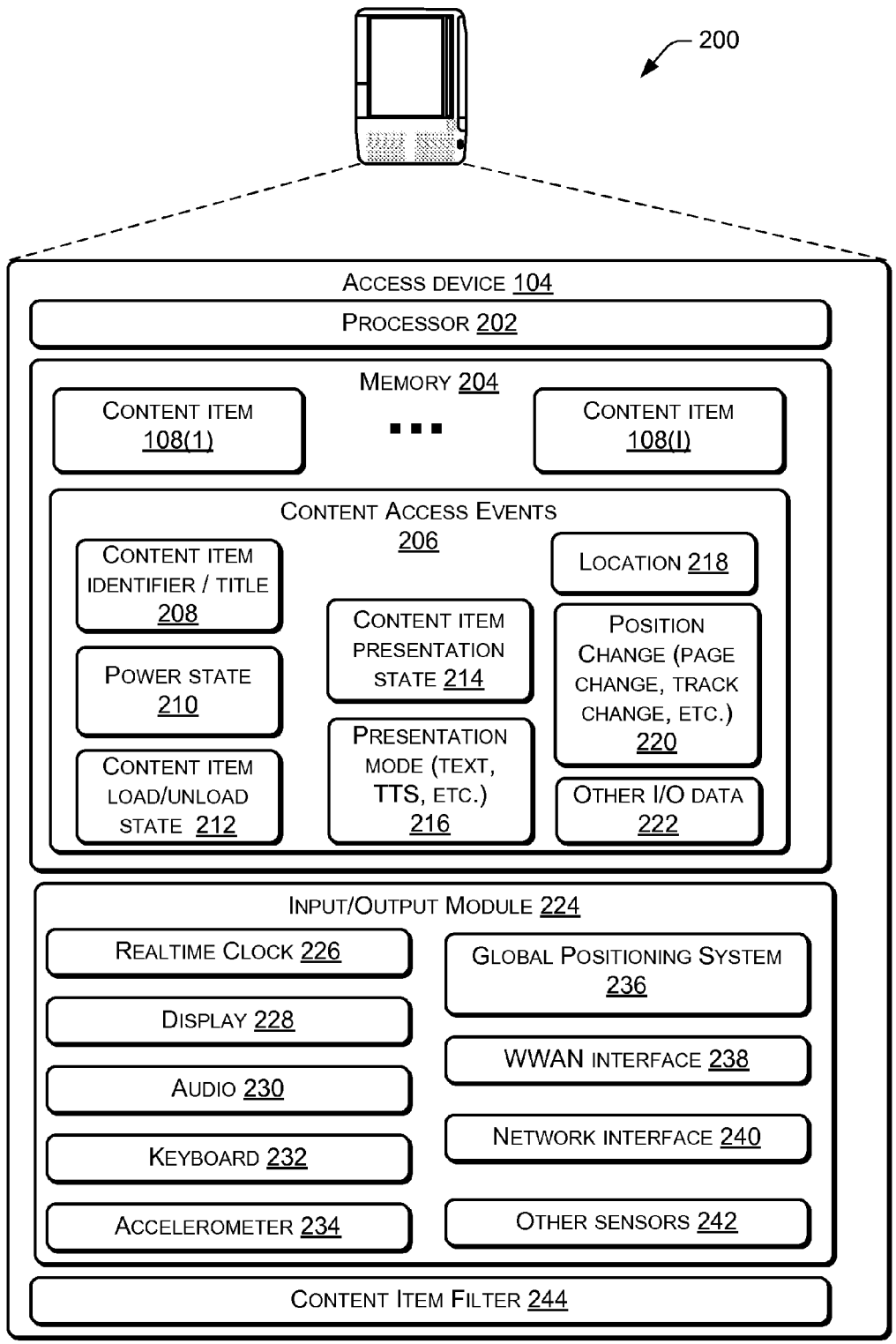
FIG. 2 is a block diagram illustrating selected modules in an access device of FIG. 1 that retrieves and presents the content items.

FIG. 2 shows selected modules in an illustrative access device 104 from FIG. 1. The access device 104 includes one or more processors 202 configured to execute instructions and access data stored in memory 204. The memory 204 is representative of computer-readable storage that may be implemented as volatile and/or non-volatile memory. Content items 108(1)-(I) may be stored in the memory 204 (as shown) or otherwise accessed by the access device 104 for consumption. For example, an electronic book reader may render pages of an electronic book on a display for viewing, or an electronic player device may play audible sounds from a music track for listening.

During access of the content items 108(1)-(4 the access device generates content access events (CAEs) 206 that generally pertain to data associated with accessing the content items 108(1)-(I). The CAEs 206 may manifest as various forms of data, such as access device status, flags, events, user inputs, etc. In some implementations, the CAEs 206 may be stored in the memory 204 (as shown) and/or stored remotely (e.g., in memory of the DCRS 124). While many CAEs may be available, in some implementations only selected CAEs may be stored. In one particular implementation (as illustrated in FIG. 2), the CAEs 206 may include:

A content item identifier 208, such as title, identification number, alphanumeric string, etc.

A power state 210 that indicates which components of the access device 104 are active. For example, whether network interfaces or radios are on, off, or in sleep mode during access of a content item 108.

A load and/or unload state 212 to indicate whether a content item 108 is loaded into the memory 204. The endpoints of the load or unload may also be stored, as well as whether the user retrieved a content item 108 from external storage and stored in the memory 204, or vice versa.

A content item presentation state 214 to indicate when a content item 108 is accessed by the user for display, playback, etc.

A presentation mode 216 that specifies various modes, such as orientation of display, whether textual data was read using a text-to-speech (TTS) feature, translated, etc.

A location 218 of the access device when it accessed the content, including venue (e.g., airplane, night club, etc.), specific geolocation, or both.

A position change 220 in the content item during access. For example, the user 102(1) might read every chapter of the book "Kernel Development" in sequential order, but watch a scene from the middle of the movie "Bladerunner."

Other input/output data 222 that may be captured and stored by the access device 104. For example, accelerometer data may be included to determine when the user was in motion during consumption of content.

The access device 104 further includes a set of input/output devices grouped within an input/output module 224, which may be used to provide the input/output data 222 for CAEs 206. These input/output devices in the module 224 include:

- A realtime clock 226 to provide date and time. This clock may be used to compute time-based CAE, such as when a content item is accessed, or how long a user remains in a section of the content item.
- A display 228 to present content items visually to the user, and optionally act as an input where a touch-sensitive display is used.
- An audio device 230 to provide audio input and/or output of content items.
- A keyboard 232 to facilitate user input and may include pointing devices such as a joystick, mouse, touch screen, control keys, etc.
- An accelerometer 234 to generate orientation and relative motion input.

For example, this may be used to determine orientation of the access device 104 during consumption of a content item.

- A global positioning system (GPS) 236 to enable determination of geolocation, time data, velocity, etc. The GPS 236 may be used to generate position or location-based CEAs that may be used to help determine where user behavior occurs. For instance, such location-based CEAs may suggest whether users are more likely to abandon certain content items when they are located in, or away from, a particular place, or perhaps on the move.
- A wireless wide-area network (WWAN) 238 to provide a communication connection to a network 120. For example, WWAN may allow the access device 104 to connect to DCRS 124 while traveling.
- A network interface 240 to facilitate a local wired or wireless communication connection to a network 120.
- Other sensors 242, which may include ambient light level sensors, barometric pressure, temperature, user biometrics, etc.

The access device 104 may further include a content item filter 244 configured to filter content items for presentation to the user. For example, the content item filter 244 may be configured to present content items to the user based on abandonment status, as illustrated by the various sections in the listing 106 of FIG. 1.

Exemplary Server

Figure 3:
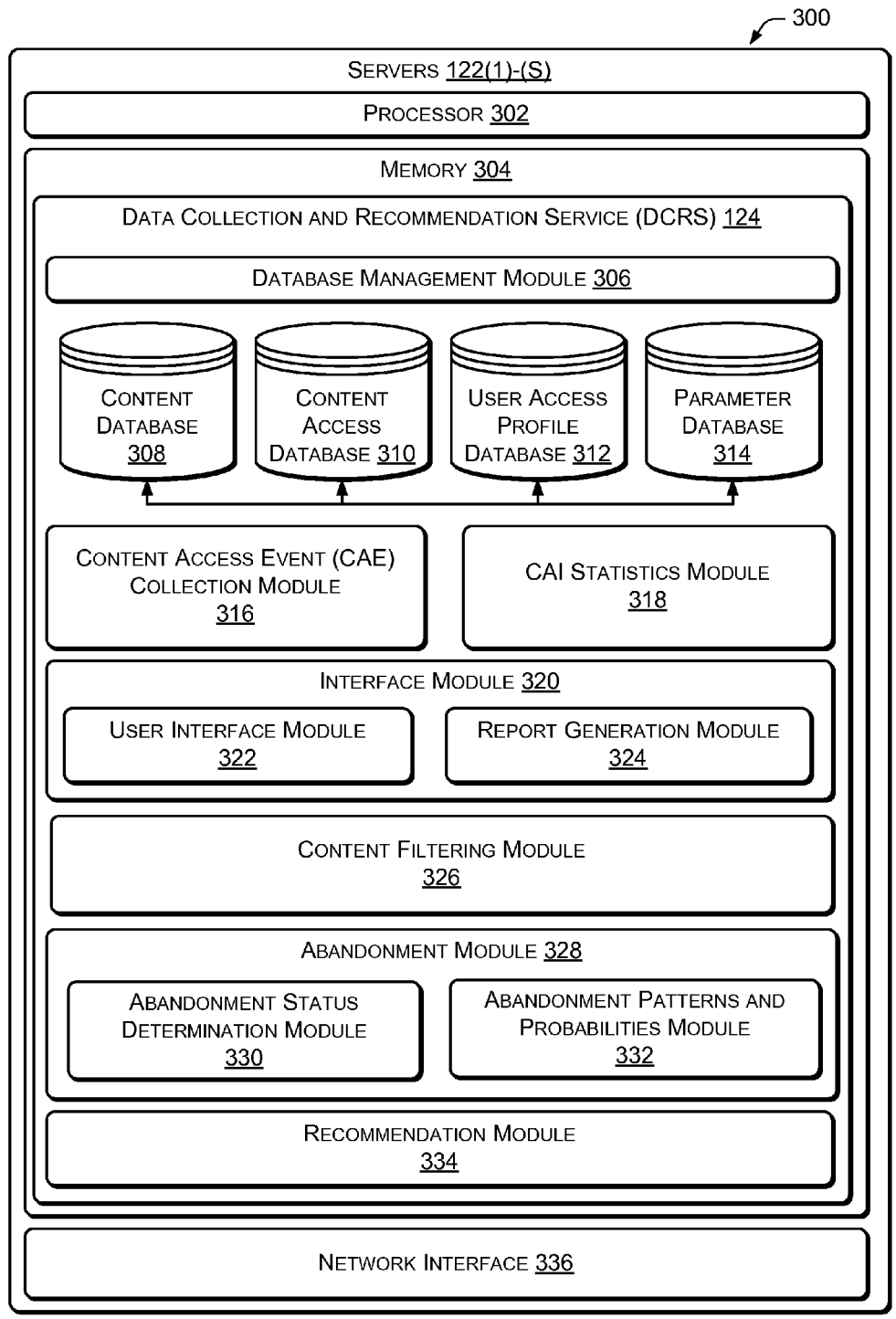
FIG. 3 is a block diagram illustrating selected modules in a server system used to host the abandonment reporting service, as shown in the architecture of FIG. 1. The server system may also maintain or otherwise provide access to multiple databases, including a content database, customer database, user access profile database, and a parameter database.

FIG. 3 shows selected modules 300 in the system of servers 122(1)-(S) used to host the DCRS 124, as shown in the architecture of FIG. 1. The server system, referenced generally as 122, includes processors 302 that execute instructions and access data stored in a memory 304. The memory 304 implements a computer-readable storage media that may include, for example, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor.

Selected modules are shown stored in the memory 304. These modules provide the functionality to implement the data collection and recommendation service (DCRS) 124. One or more databases may reside in the memory 304. A database management module 306 is configured to place in, and retrieve data from, the databases. In this example, four databases are shown, including a content database 308, a content access database 310, a user access profile database 312, and a parameter database 314. Although shown as contained within the memory 304, these databases may also reside separately from the servers 122(1)-(S), but remain accessible to them. These databases 308-314, and selected items of data stored therein, are discussed in more detail below with reference to FIGS. 4-7, respectively. Also present, but not shown for clarity, may be a user database including information such as user name, age, gender, social affiliations, geolocation, etc.

A CAE collection module 316 may also be stored in the memory 304. The CAE collection module 316 is configured to gather content access event data from access devices 104 (1)-(N). As described above with respect to FIG. 2, the CAEs include access device status, flags, events, user inputs. For example, the CAE collection module 316 may gather a set of CAEs from access device 104(1) indicating that the "Illustrated History of the Fork" was last displayed on screen two months ago for a period of ten minutes in a landscape presentation mode while on an airplane at an altitude of 31,000 feet and speed of 513 miles per hour. Furthermore, the user only accessed seven pages of material during that time, and at the conclusion of the access, unloaded the content item from local storage on the access device 104(1). All of these factual data points may be captured as CAEs.

A content access information (CAI) statistics module 318 may be stored in memory 304 and configured to generate content access information statistics from the CAE data collected by the CAE collection module 316. Content access information is described in more detail below with respect to FIG. 5. In another implementation, the access device 104 may process CAEs to produce CAI or an intermediate data set, resulting in a smaller set of data for transmission over network 120 and/or to reduce processing load on DCRS 124.

An interface module 320 may be stored in memory 304 and configured to allow access to abandonment information determined from content access information. Interface module 320 includes a user interface (UI) module 322 and a report generation module 324. The UI module 322 is configured to provide the user with controls and menus suitable to access the abandonment information and recommendations. The report generation module 324 is configured to transform abandonment information and recommendations into user selected formats and representations.

A content filtering module 326 may reside in the memory 304 and be configured to filter content items under analysis by user specified parameters, such as those stored in the parameter database 318. For example, a user may wish to select only abandonment data for a particular genre, such as mysteries, or by a particular author.

An abandonment module 328 may also reside at the server system 122 and be stored in the memory 304. The abandonment module 328 aggregates abandonment information and analyzes it to determine whether individual content items have been, or are in the process of being, abandoned by a user. In the illustrated implementation, the abandonment module 328 is functionally composed of an abandonment status determination module 330 and an abandonment patterns and probabilities module 332.

The abandonment status determination module 330 uses the content access information to determine when a content item has been abandoned. For example, the module 330 might deem a content item as "abandoned" when the content item has been accessed (as measured, for instance, against an access threshold) and subsequently a significant time has lapsed since the user last accessed the item (as measured, instance, when a time interval since last access exceeds a threshold value). The process for determining abandonment is described in more detail below with regards to FIGS. 16-18.

The abandonment patterns and probabilities module 332 uses the content access information from CAI statistics module 318 to generate abandonment information about content items. The abandonment information might include, for example, abandonment patterns observed from user access behavior (e.g., what consumption path of item access by a user results in lowest overall abandonment rate, what location results in lowest abandonment rate for a specific user, etc.), probabilities of content items being abandoned, and other statistics (e.g., most/least abandoned content item, most/least abandoned portion of a content item, most/least abandoned genre, most/least abandoned authors, etc.) Abandonment statistics are discussed below with respect to FIG. 15.

The server system 120 may also be configured to execute a recommendation module 334, which is shown stored in the memory 304. The recommendation module 334 is configured to provide recommendations based on results computed by the abandonment module 338 and filtered by the content filtering module 326. The generation of recommendations is discussed in more depth with respect to FIG. 19.

The server system 122 may also be equipped with a network interface 336, which provides a local wired or wireless communication connection to the network 120. The network interface 336 allows for communication with the access devices 104 via the network 120, as shown in FIG. 1.

Figure 4:
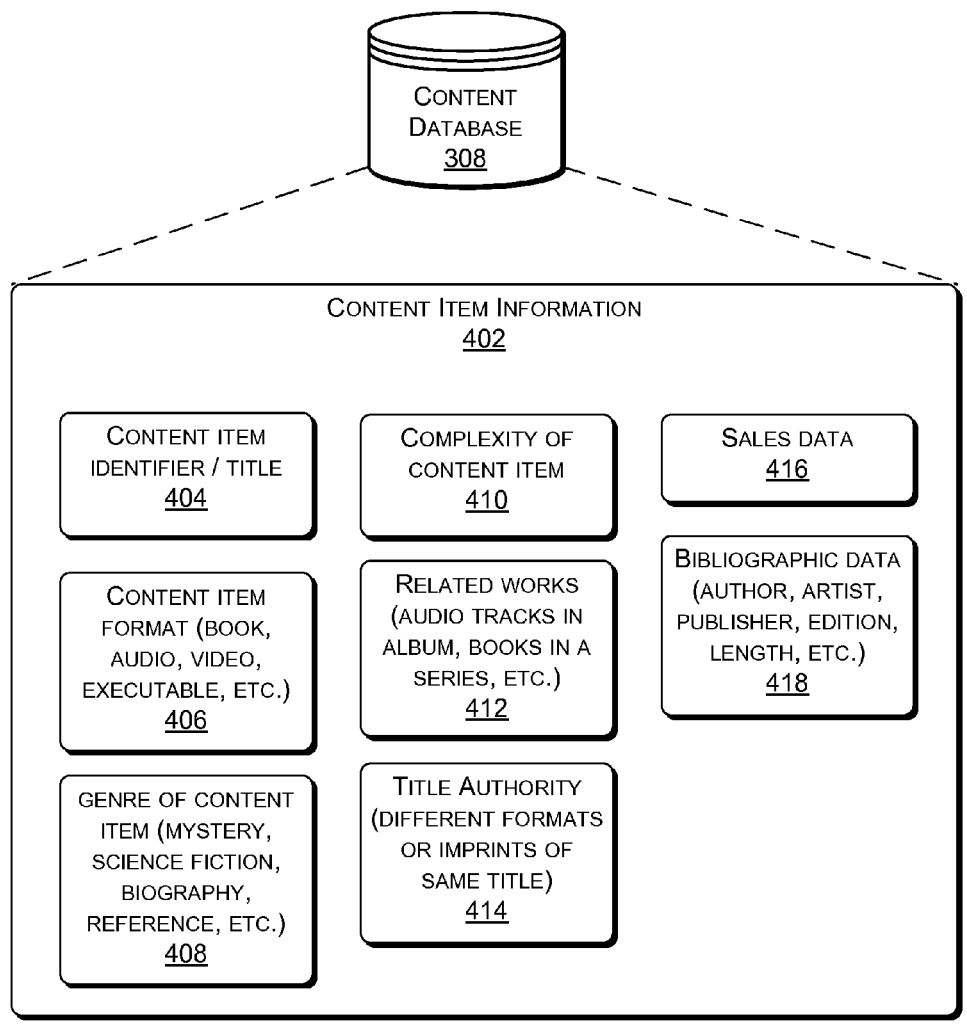
FIG. 4 shows an illustrative content database of FIG. 3, which may be used to store content items to be retrieved by the access devices.

FIG. 4 shows an illustrative content database 308 maintained at, or accessible by, the servers 122(1)-(S) of FIG. 3. The content database 308 is configured to contain content item information 402, which includes essentially any information pertaining to content items that a user may wish to access and consume. For discussion purposes, the content item information 402 may include the following:

Content item identification 404, such as title, identification number, invariant reference number, etc.

Content item format 406, such as whether the content item is available as a book, audio, video, executable program, etc.

Genre of content item 408, such as mystery, science fiction, biography, horror, reference, game, utility, etc.

Complexity of content item 410. For example, in textual content items, complexity may be determined from a Flesch-Kincaid Readability score, statistics based on statistically improbable phrases, or from other metrics which may be used to ascertain the relative intricacy of the content item. Complexity may also be determined from the mean and the variance of reading velocity, from the frequency of dictionary look-ups, or from a combination of these measures. Complexity of other types of content items may be determined by other suitable metrics. For example, a musical piece may have complexity determined by spectral analysis, or an executable may have complexity determined by the size of the code and number of possible user inputs during use. In another implementation, complexity may be derived from user feedback.

Related works 412, such as music tracks found in the same album, books in a series, movies by the same director, etc.

Title authority 414, which links or associates multiple instances of the same work or set of works (e.g., different formats or imprints of the same title).

Sales data 416, such as historical sales data, quantities sold/licensed, profit margin, returns, etc.

Bibliographic data 418, such as author, artist, publisher, edition, length, catalog number, etc.

Figure 5:
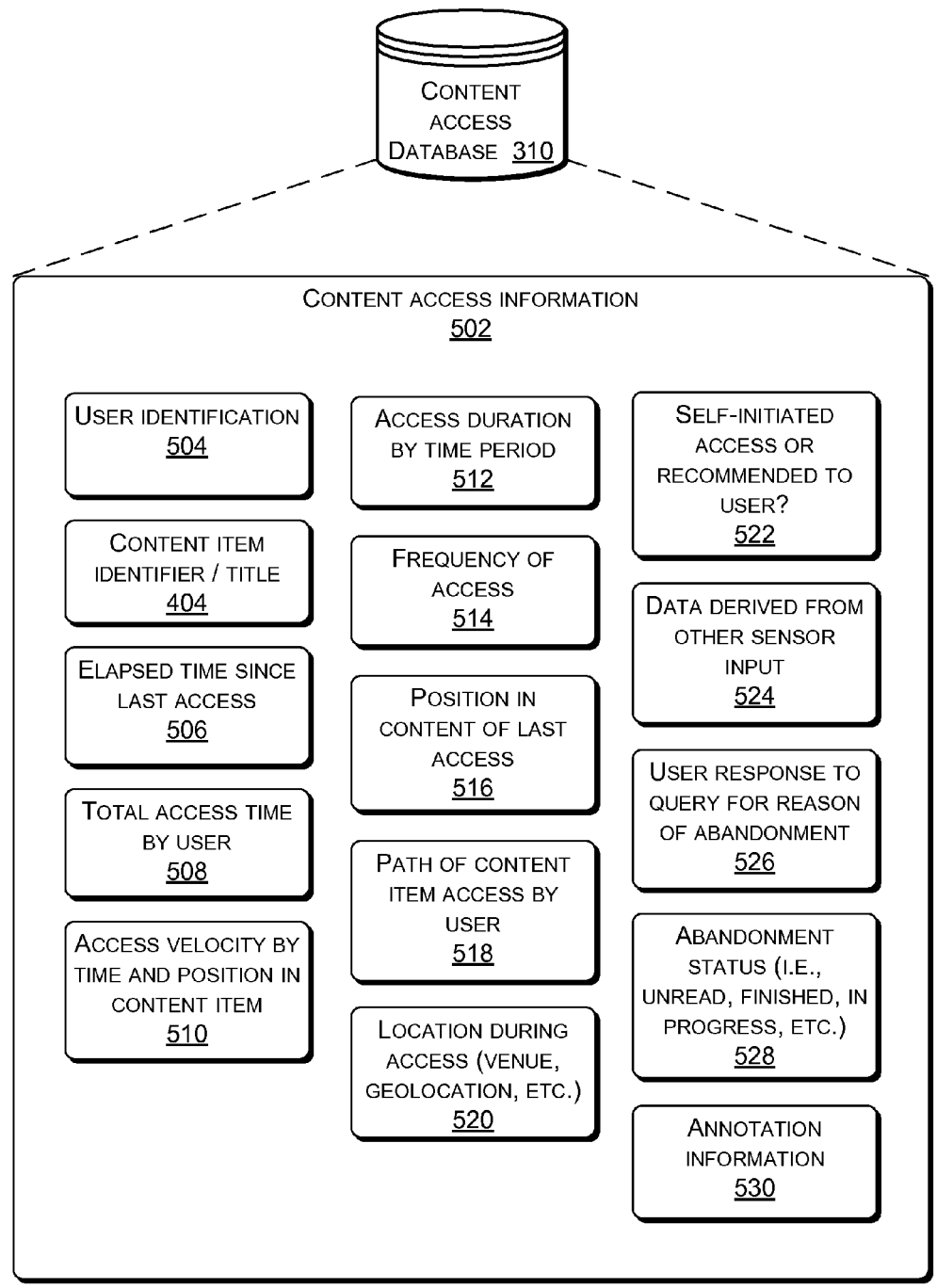
FIG. 5 shows an illustrative content access database of FIG. 3, which may be used to store content access information.

FIG. 5 shows an illustrative content access database 310 of FIG. 3, which is configured to contain content access information 502. Content access information 502 may be derived from CAEs 206. For discussion purposes, the content access information 502 may include the following:

A user identification 504, allowing association of a particular user with a particular set of content access information.

A content item identification 404, as described above.

Information element 506 pertaining to an elapsed time since last access. In one implementation, access may be defined as a user interacting with the content item such that minimum duration thresholds are exceeded. For example, access to a book may be defined as two page turns in over ten seconds, to minimize erroneous data from inadvertent interaction such as incorrectly selecting a book.

Element 508 that relates to a total access time of the content item by the User.

An access velocity (a rate of item consumption per unit time) by time and/or position in the content item 510. For example, the user read 113 words per minute in chapter 3.

An access duration by time period 512. For example, the user read for 37 minutes on April 1. This access duration by time period 512 may be for a single content item or for all content items accessed by a user during a specified time period selected.

A frequency of access 514. For example, how often a content item is accessed, how often any content item is accessed, etc.

A position in content of last access 516. For example, the last access was in chapter 5.

A path of content item access by user 518. For example, the user skipped from chapter 1 to chapter 5 then chapter 3, then switched to another book, then returned to read chapter 7.

A location during access 520. Locations include venues such as airplanes, night clubs, restaurants, etc., specific geolocation such as 48.93861° N 119.435° W, or both. For example, the user 102 accessed content item 108 from access device 104 which was located in Trafalgar Square.

Information element 522 directed to whether initial access to the content item was self-initiated or the result of a personal or automated recommendation to a user.

Data derived from other sensor inputs 524, such as an accelerometer or ambient light sensor. For example, accelerometer input may provide data indicating the user reads while walking. In another example, ambient light input in conjunction with other CAI may indicate that users have a greater rate of abandonment when reading in low light levels.

A user response to a query as to the reason for abandonment 526 may be stored where abandonment has been determined, as described below with regards to FIGS. 16-18, or explicitly indicated by the user.

An abandonment status 528 as described above. For example, after determination of abandonment status, a content item may be flagged as abandoned.

Figure 6:
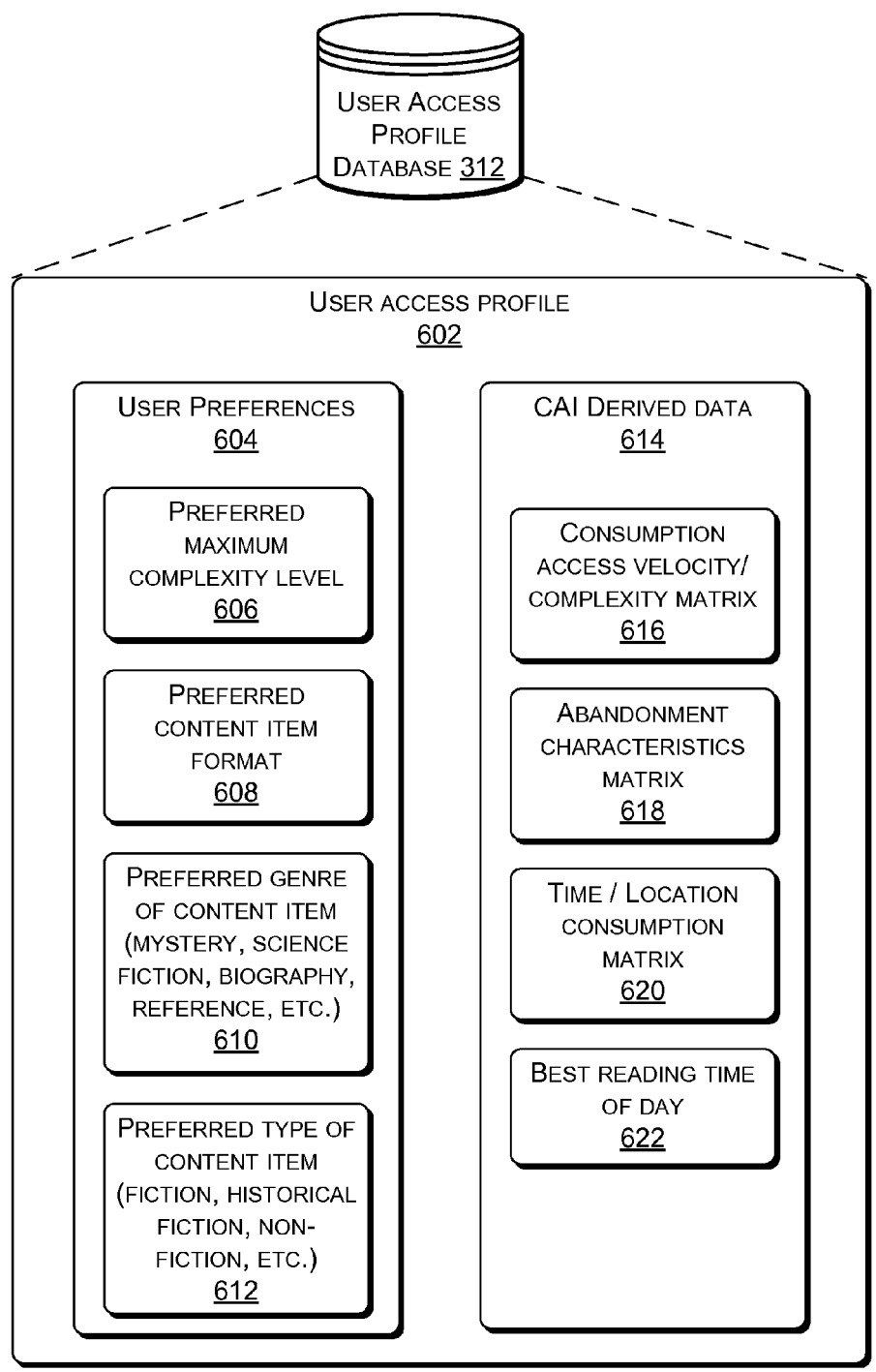
FIG. 6 shows an illustrative user access profile database of FIG. 3, which may be used to store user access profiles.

Annotation information 530, such as annotations made by users. Annotations can be in the form of notes, highlights, bookmarks, etc FIG. 6 shows an illustrative user access profile database 312 of FIG. 3, which is configured to contain a user access profile 602. User access profile 602 may include a variety of information about the user and their preferences. For discussion purposes, the user access profile 602 may include user preferences 604 which have been explicitly entered by a user or derived from other user data. These user preferences 604 may include the following:

- A preferred maximum complexity level 606. For example, the user prefers content items not exceeding a grade 16 reading level.
- A preferred content item format 608. For example, the user prefers to use the text-to-speech function, largest font available, etc.
- A preferred genre of content items 610, such as mystery, science fiction, biography, horror, reference, etc.
- A preferred type of content item 612, such as text, audio, video, etc.

The user access profile 602 may also include CAI derived data 614 which has been derived from CAEs 206. For discussion purposes, CAI derived data 614 may include the following:

- A consumption access velocity/complexity matrix 616. For example, a user (or group of users) may have a matrix describing the relationship between access velocity and complexity. Thus, the user (or group of users) may exhibit a high access velocity (such as 33 pages per minute) with low complexity content items such as a brochure, but may exhibit a low access velocity (such as 1 page per minute) for a high complexity content item such as a math treatise.
- An abandonment characteristics matrix 618. This matrix would characterize a relationship for a user (or group of users) between consumption statistics and abandonment.
- A time/location consumption matrix 620 similar to the previous matrices. The time/location consumption matrix 620 establishes a relationship between clock time and location (such as venue or geolocation) and consumption of content. For example, a user may have the most uninterrupted time to read from 7 a.m. to 8 a.m. while on the train.
- A best reading time of day 622. For example, a user may exhibit a personal highest average access velocity during 8 a.m. and 9 a.m. local time.

Figure 7:
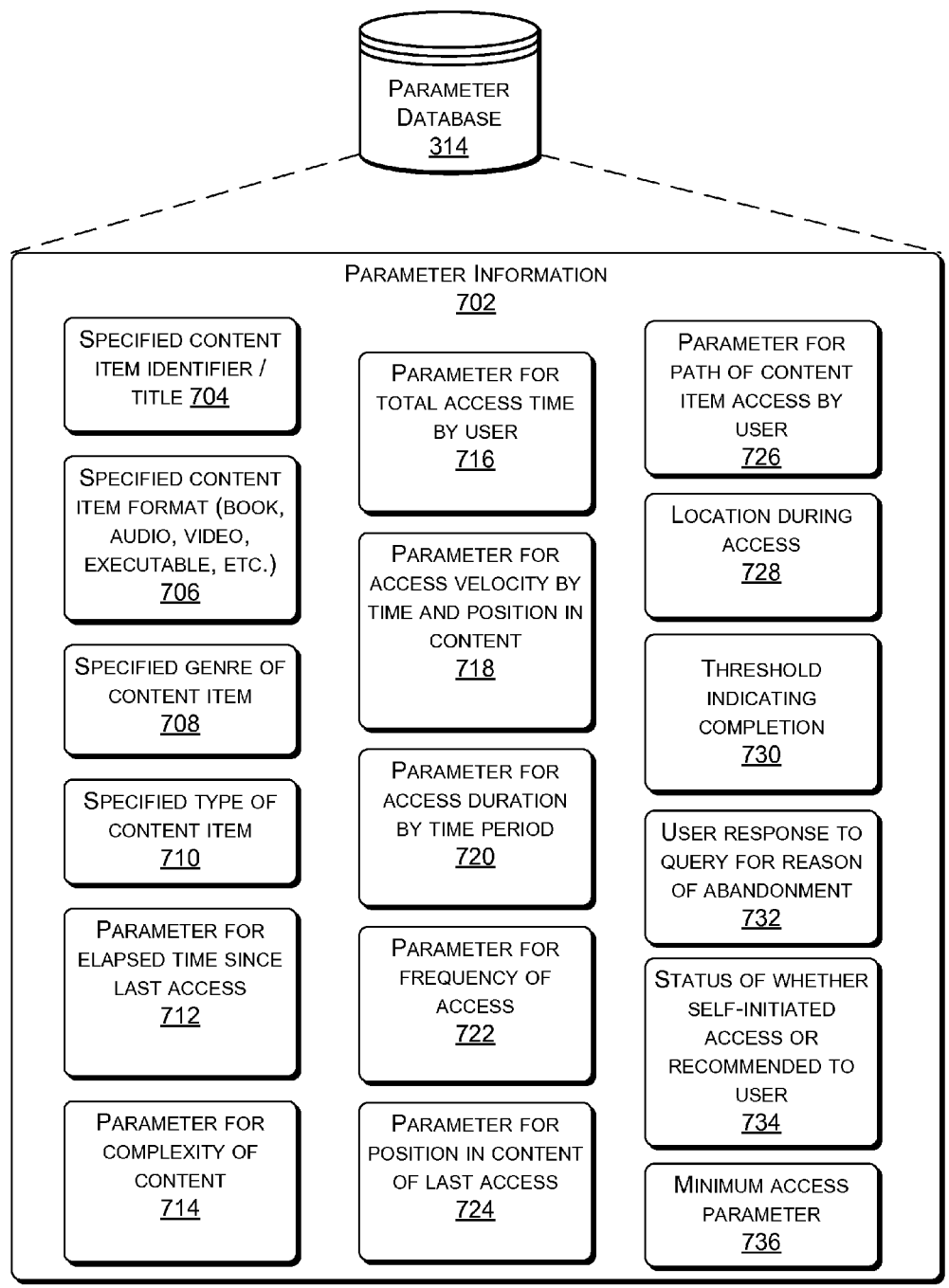
FIG. 7 shows an illustrative parameter database of FIG. 3, which may be used to store parameters used to determine abandonment.

FIG. 7 shows an illustrative parameter database 314, which contains various parameter information 702. This parameter information 702 may be used to set thresholds, boundaries, or other mechanisms (e.g., name-value pairs) for abandonment determination and reporting. It is noted that thresholds are not intended to be limited to binary thresholds (e.g., exceed, not exceed), but can also encompass approximations derived from data series. Parameter information 702 may include the following:

- A specified content item identifier title 704. For example, a certain set of parameters may only be applied to a particular content item.
- A specified content item format 706. For example, a particular set of parameters may apply to all audio content items.
- A specified genre of content item 708. For example, a particular set of parameters may apply to all biographies.
- A specified type of content item 710. For example, a particular set of parameters may apply to all historical fiction.
- A parameter pertaining to elapsed time since last access of a content item 712. For example, one user may wish to consider content items abandoned when it has not been accessed for eleven days while another user may wish to consider content items abandoned after only seven days.
- A parameter for complexity of content 714. For example, a user may wish to determine abandonment statistics by content items which are of low complexity.
- A parameter for total access time by user 716. For example, a user may consider a content item abandoned which has a total access time below the threshold and which has exceeded a threshold of elapsed time since last access 712.
- A parameter for access velocity by time and position in content 718. For example, abandonment may be characterized as occurring when the access velocity drops below a threshold during a particular portion of a content item.
- A parameter for access duration by time period 720. For example, abandonment may be characterized as occurring when a user accesses the content item for less than eleven minutes in an hour.
- A parameter for frequency of access 722. For example, abandonment may be characterized as occurring when the frequency drops below five accesses per week.
- A parameter for position in content of last access 724. For example, abandonment may be characterized as occurring when the user 102 has accessed beyond a certain point, such as chapter 17.
- A parameter for path of content item access by user 726. For example, abandonment may be characterized as occurring when the user 102 skips around in the content item rather than accessing the content item in a linear fashion.
- A location during access 728. For example, a user may wish to determine abandonment as occurring when one of these other parameters has been exceeded at a particular venue or geolocation.
- A parameter indicating completion 730. For example, completion may be considered to be access of more than 80% of a content item, correct completion of a specified number of quiz questions associated with the content item, etc.
- A user response to query for reason of abandonment 732. For example, a user may be directly prompted as to whether and/or why a content item was abandoned.
- A status of whether initial access to the content item was self-initiated or resulted from a personal or automated recommendation to the user 734. For example, parameters for abandonment may be less stringent for content items which were recommended by an automated process.
- A minimum access parameter 736. For example, a content item may need to be accessed a minimum of twice, or for a minimum amount of time such as 21 seconds, before that access is considered noteworthy. This may be useful in reducing "false access" data which may occur from a user inadvertently selecting an undesired content item.

Parameter database 314 may provide for determinations of abandonment and recommendations with varying scope. For example, at least a portion of the parameters from the parameter database may be independent between users. That is, one user may have thresholds which differ from those of another user. Alternatively, abandonment information may be generated with all users set to the same threshold, or combinations thereof.

Furthermore, these parameters may be static or dynamically modified either individually or in combination. For example, parameters may be dynamically adjusted to become less stringent during holidays when users are typically vacationing, adjusted to be less stringent for highly complex material, adjusted to be highly stringent for content items assigned in an academic setting, etc.

Illustrative Graphs Based on Content Access Information

Having described one implementation for an architecture that monitors and analyzes user abandonment of content items, the following discussion with respect to FIGS. 8-14 provides an example implementation of presenting abandonment metrics, such as content access information. Some of these figures are described in the context of reading electronic books, but may be applied more generally to any content item. The following graphs may be generated by an abandonment patterns and probabilities module 332 using content access information 502 derived from content access events 206 gathered from access devices 104(1)-(N) and aggregated by data collection and recommendation service 124.

Figure 8:
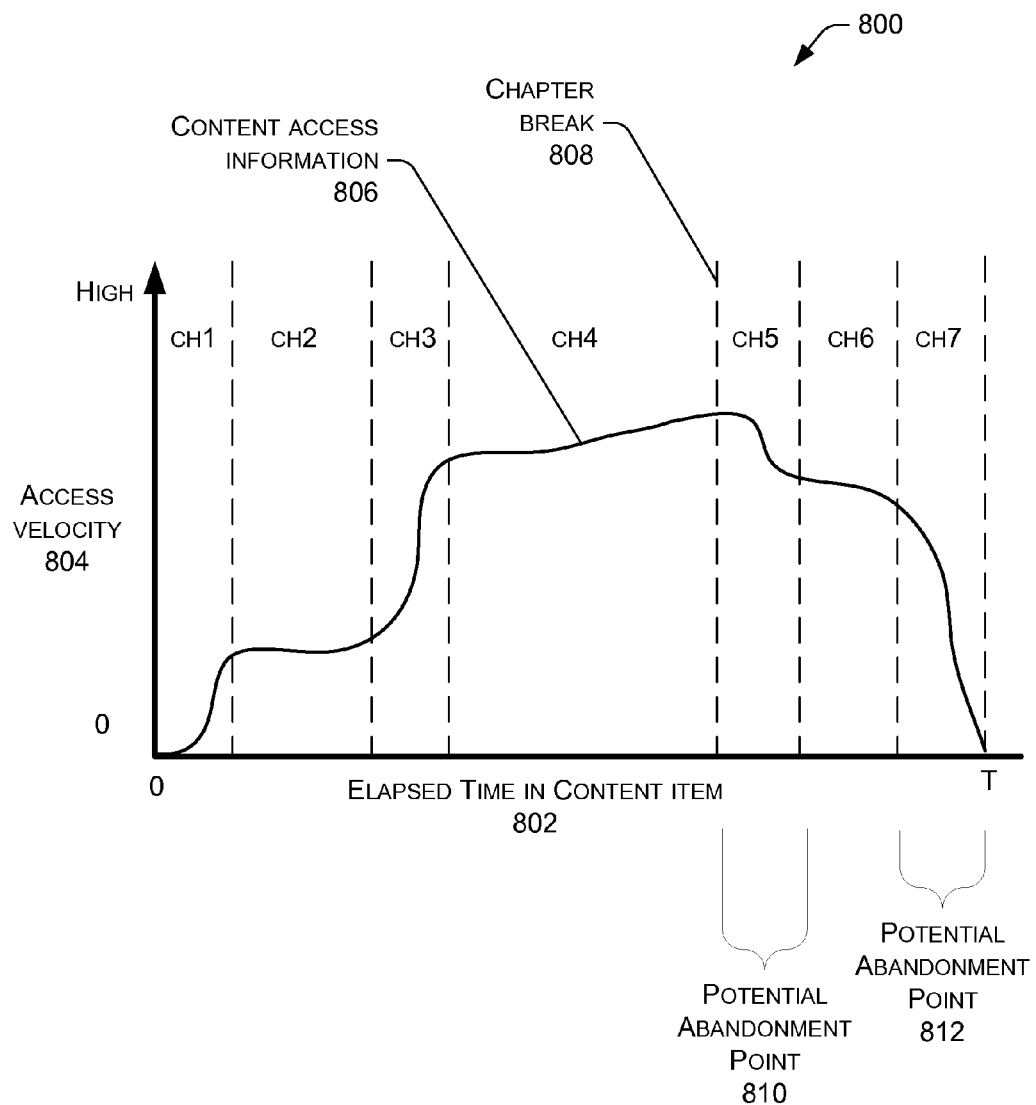
FIG. 8 shows a graph of elapsed time in a content item versus access velocity generated from content access information.

FIG. 8 shows a graph 800 that presents content access information as a function of elapsed time in a content item and access velocity as a way to chart user behavior during consumption of the content item. Elapsed time in a content item is indicated along a horizontal axis 802, ranging from time zero to time "T." A vertical axis 804 shows access velocity, which may be measured in a number of ways, such as words per minute, pages per unit of time, number of times a chapter is accessed in a period of time, and so on. The access velocity of the y-axis 804 ranges from zero to high. In one example implementation, the report generation module 324 of the data collection and recommendation service 124 collects the time lapses and access data from the devices 104(1)-(N), and generates content access information used to form the graph 800.

The content access information (CAI) is plotted as a curve 806 onto the graph 800. In this example, the content access information 806 may be derived from content access events such as date/time of page changes to produce access velocity. In this graph 800, the higher the CAI curve 806, the greater the aggregate access velocity collected across multiple users. This serves as a proxy for the users interest in the content item, as a higher curve means the users are more interested in the content and less likely to abandon it. In the context of an electronic book, relative locations of chapter breaks 808 are indicated with vertical dashed lines. The horizontal distance between chapter breaks 808 also indicates relative length of each chapter in time spent consuming. The CAI curve 806 extends from the beginning of chapter 1 through the end of chapter 7. It is noted that for other content items, these breaks may represent sections, tracks, or scenes.

In chapters 3 and 4, the aggregate user group appears to be enjoying the content item as the CAI curve 806 increases in access velocity. At chapter 5, however, the CAI curve 806 shows a decrease in access velocity. This may indicate a potential abandonment point 810, perhaps because the users are exhibiting a behavior that suggest less interest in the content at this point. The interest appears to wane further in chapter 6, and then an abrupt drop in access velocity is seen in chapter 7 by the steep downward slope of CAI curve 806. This steep fall off at chapter 7 represents another potential abandonment point 812. Each of these potential abandonment points 810 and 812 may be of interest to a reader who wants to know how other readers responded to the material, or may be of use to the author or publishers to ascertain places in the content where users considered abandonment or actually abandoned the item altogether. In some circumstances, revisions may be suggested based on this abandonment data, as well as what users found interesting in other parts of the book (or other similar books).

Figure 9:
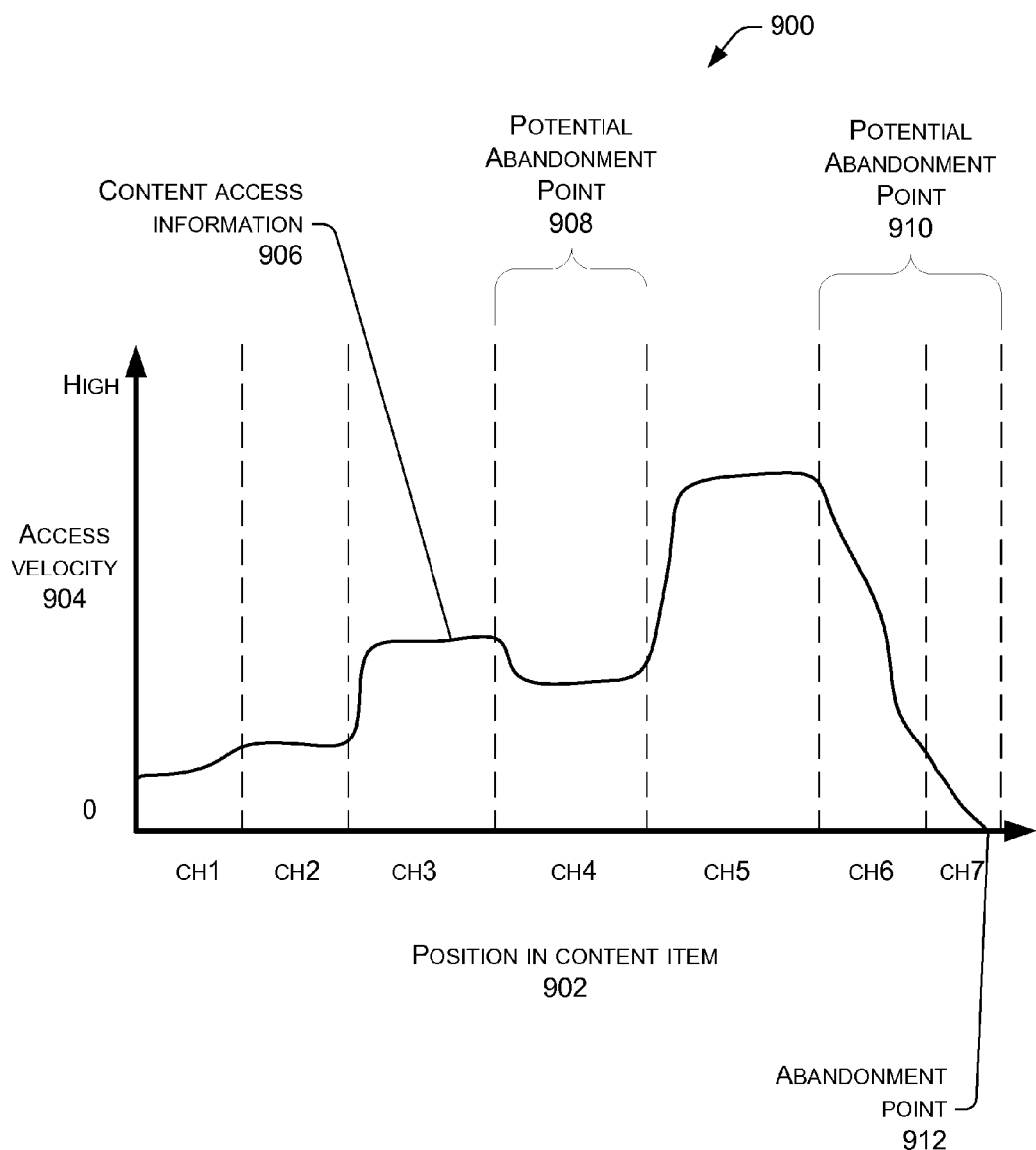
FIG. 9 shows a graph plotting position in a content item versus access velocity generated from content access information.

FIG. 9 shows another example graph 900 in which content access information is manifest as a curve computed as a function of access velocity exhibited by an aggregate of users and position in the content item. The graph 900 differs from the graph 800 (FIG. 8) in that the x-axis is position in content item (e.g., chapter, track, scene, etc.), rather than time in each section of the content item. Position in the content item is indicated along a horizontal axis 902. In this example of books, the position ranges from chapter 1 through chapter 7. Other positions such as an invariant reference, pages, sections, etc., may also be used. A vertical axis 904 shows access velocity, ranging from zero to high. As above with respect to FIG. 8, chapter breaks are indicated with vertical dashed lines.

A CAI curve 906 is plotted on the graph 900, and extends from the beginning of chapter 1 through chapter 7. At chapter 4, the access velocity decreases as compared with chapter 3, indicating a potential abandonment point 908. A steep decrease in access velocity is depicted in chapters 6 and 7, indicating another potential abandonment point 910. Further, actual abandonment occurs at point 912, where the collection of users cease accessing the content item as indicated by zero access velocity with remaining content in chapter 7 being left unconsumed.

Figure 10:
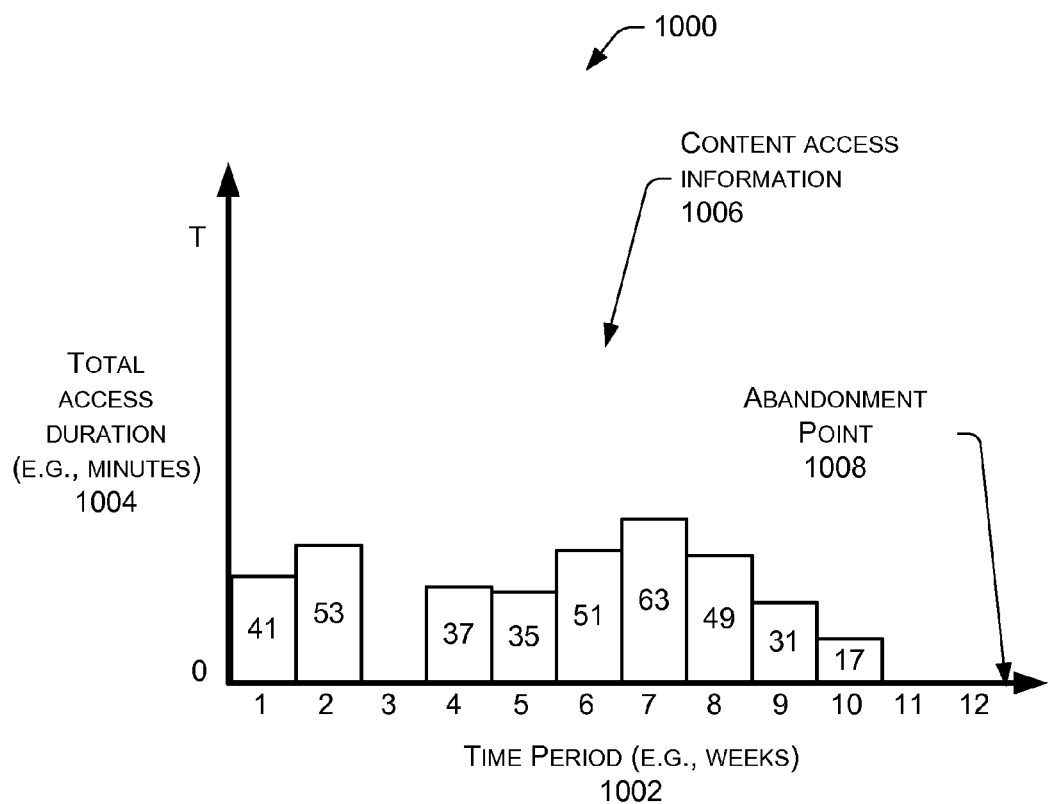
FIG. 10 illustrates a graph plotting time period versus total access duration generated from content access information.

FIG. 10 shows another possible graph 1000 of content access information that may be generated based on content access events captured by the access devices in aggregate across many users, and used to discover potential or actual abandonment. In this graph 1000, a time period measured in time units (e.g., days, weeks, months, quarters, etc.) is plotted against total access duration within those time units. As shown, a time period ranging from weeks 1 through 12 is indicated along a horizontal axis 1002. A vertical axis 1004 shows total access duration, ranging from zero to time "T." Total access duration may be measured in various time units, such as seconds, minutes, 15-minute intervals, hours, days, etc.

A bar chart 1006 generated from CAI is mapped onto the time periods, with the relative height of each bar indicating the total access duration for the given time period. For example, during week 2, the users spent, on average, a total of 53 minutes in the content item. During week 3, the users did not access the content item, and hence the total access duration was 0 minutes of access. During week 7, the users accessed the content item for a total of 63 minutes, on average, but thereafter decreased time spent in successive weeks: 49 minutes in week 8, 31 minutes in week 9, 17 minutes in week 10, and 0 minutes in weeks 11 and 12.

Potential and actual abandonment information may be determined from this graph as a function of when the users decreased or stopped accessing the content item. For example, potential abandonment may be detected during successive declining periods from weeks 7 to 11. Moreover, actual abandonment may be defined as two consecutive weeks of zero access. In this case, an abandonment point 1008 may be detected at the conclusion of week 12.

Figure 11:
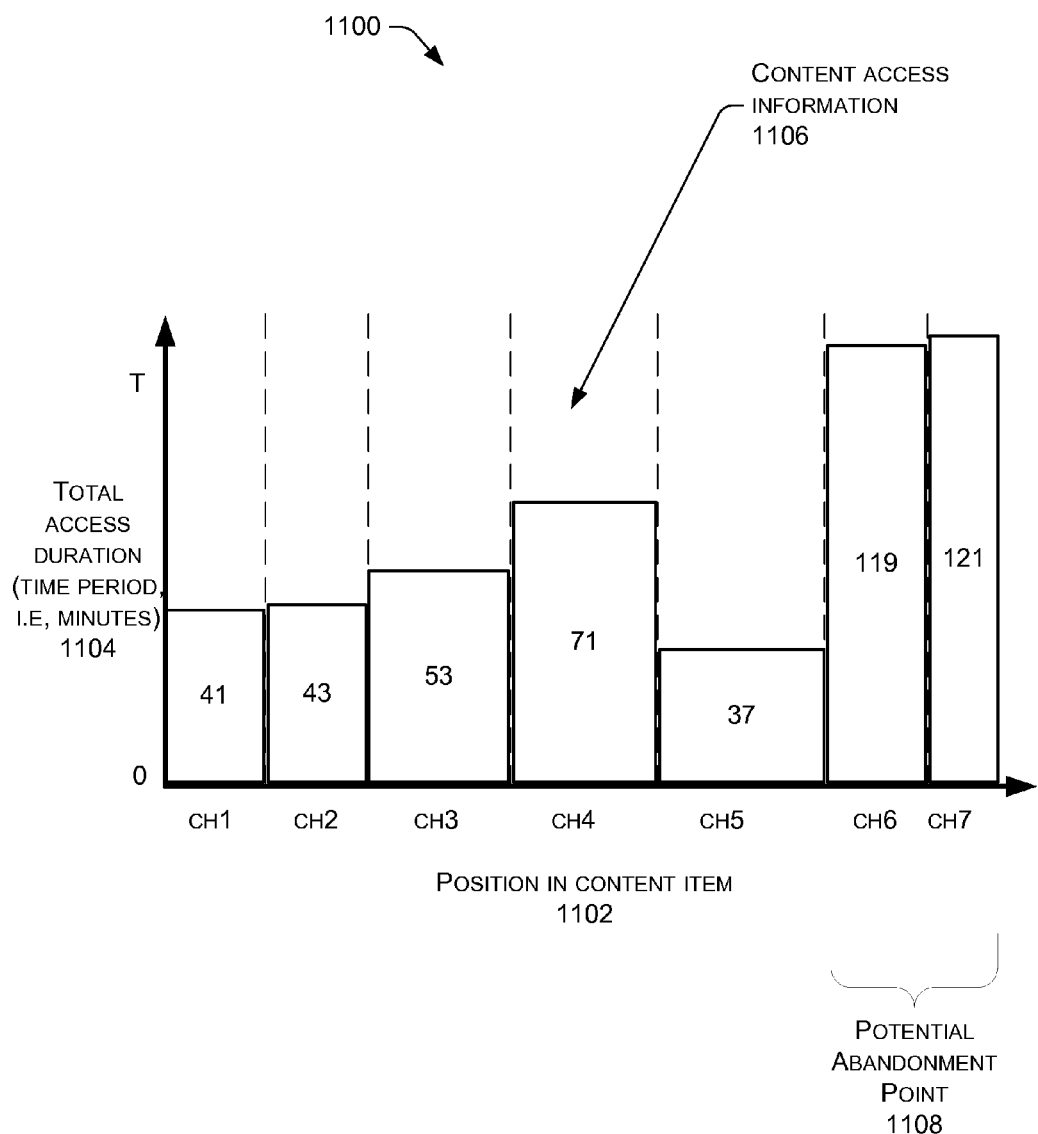
FIG. 11 depicts a graph of position in a content item versus total access duration generated from content access information.

FIG. 11 shows another representative graph 1100 in which abandonment metrics may be obtained from an aggregate of users who access a common content item. In this graph, position in the content item is indicated along a horizontal axis 1102, ranging from chapter 1 through chapter 7. A vertical axis 1104 shows the total access duration, ranging from zero to time "T." A bar chart 1106 generated from CAI is plotted on the graph, with the relative height of each bar indicating the total access duration for a given position in the content item. For instance, the total access duration for chapter 4 is 71 minutes on average for the group of users who accessed the content item. For chapters 6 and 7, the total access duration jumps to an averages of 119 minutes and 121 minutes, respectively. In this case, the significant increase in total access time for chapters 6 and 7, as compared with the other chapters, may represent a potential abandonment point 1108. That is because the users are spending inordinately larger time periods in these chapters, which may indicate that users are struggling to complete them.

Figure 12:
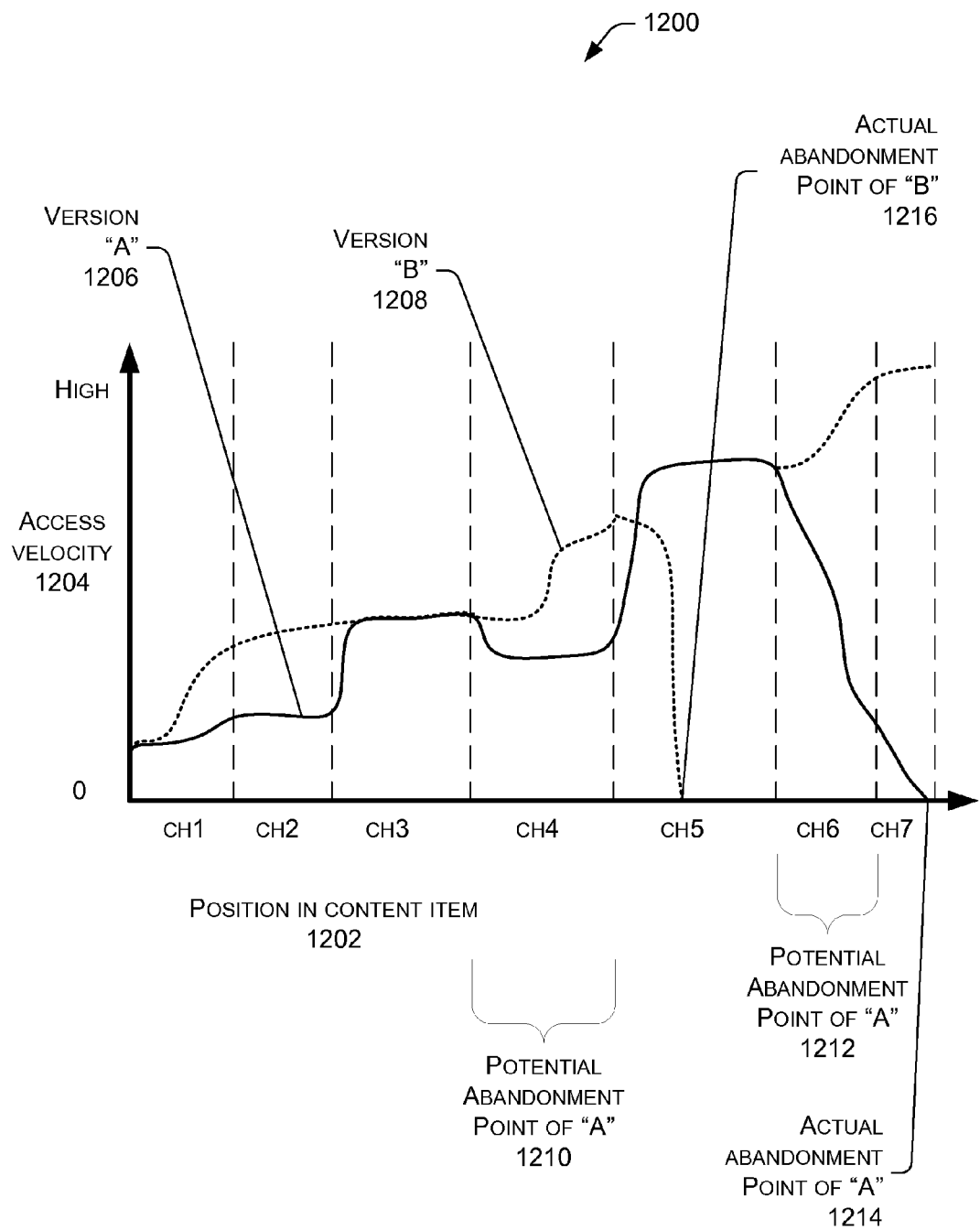
FIG. 12 illustrates a graph of position in a content item versus access velocity generated from content access information of two versions of the same content item.

FIG. 12 shows a graph 1200 in which content access information for two versions of a content item are plotted together to observe user behavior when consuming the different versions. Position in the content item is indicated along a horizontal axis 1202, ranging from chapter 1 through chapter 7. A vertical axis 1204 shows access velocity, ranging from zero to high. A first curve 1206 is shown as a solid line and generated from CAI for version "A" of the content item. A second curve 1208 is shown as a dashed line and generated from CAI for version "B" of the content item. Chapter breaks are indicated with vertical dashed lines. Both curves 1206 and 1208 extend from the beginning of chapter 1 through the end of chapter 7. The version "A" curve 1206 shows a decrease in access velocity for chapter 4, indicating a potential abandonment point 1210. The version "A" curve 1206 also shows a significant decrease in access velocity for chapter 6, indicating a potential abandonment point 1212. The version "A" curve 1206 also shows an abandonment point 1214 in chapter 7 where reading velocity goes to zero with the content item remaining.

In contrast, the version "B" curve 1208 shows a different access velocity profile as compared to the version "A" curve 1206. Unlike the version "A" curve 1206, which shows an increase in access velocity in chapter 5, the version "B" curve 1208 shows a significant decrease in access velocity for chapter 5, culminating in an abandonment point 1216 where reading velocity goes to zero in the middle of chapter 5. In this example, chapter 5 of version "A" of the content item performs better than version "B". However, the reader of version "B" resumes reading in chapter 6 and exhibits an increasing access velocity for chapters 6 and 7. Thus, chapters 6 and 7 in version "B" of the content item perform better than those same chapters in version "A". Thus, a person (e.g., reader, author, publisher, etc.) may use this graph 1200 to determine how alternate versions, such as different endings or cliffhangers, fare with users. Where appropriate, adjustments may be made to the content item to reduce the potential for abandonment.

Figure 13:
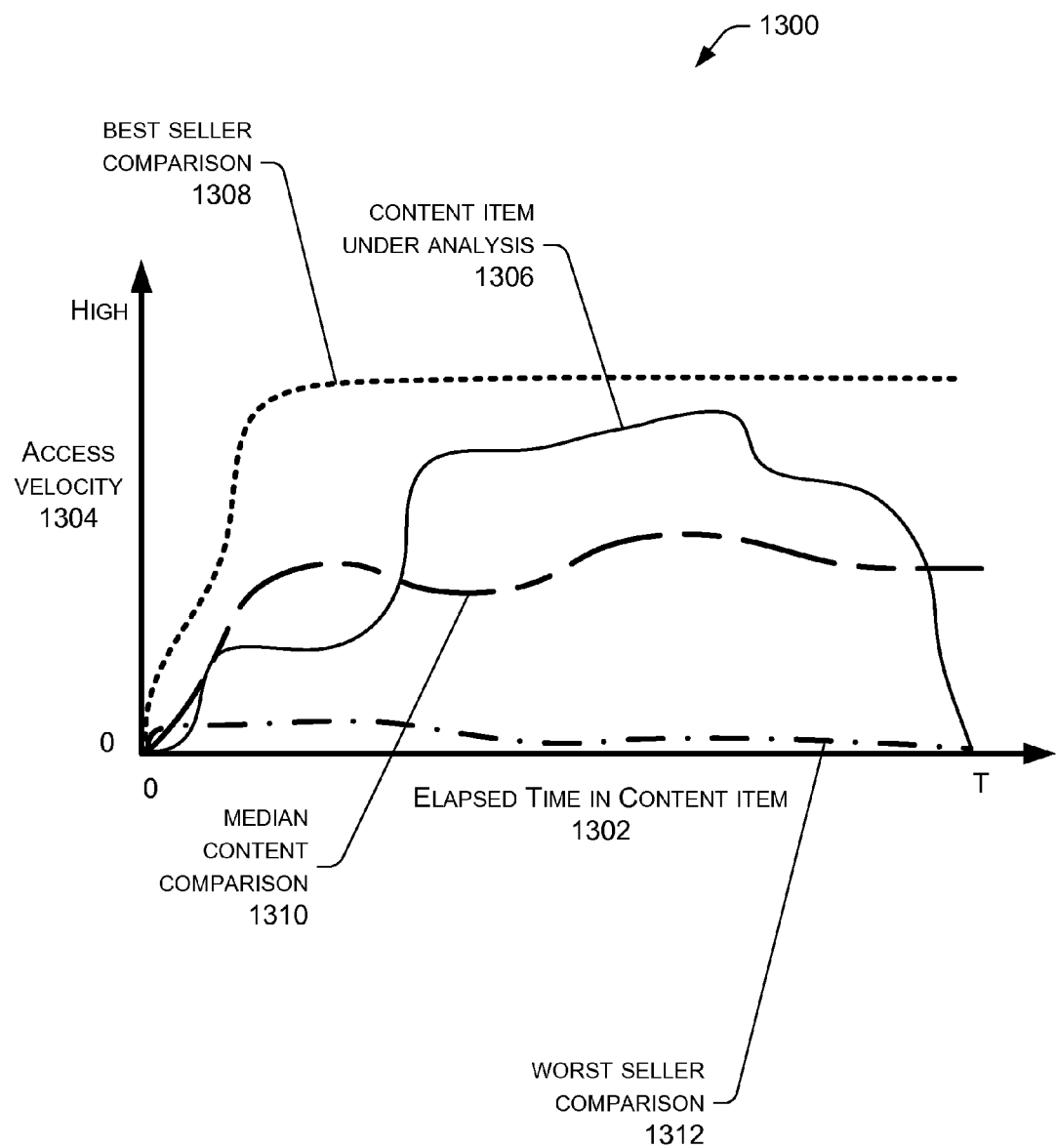
FIG. 13 depicts a graph of elapsed time in multiple content items versus access velocity generated from content access information.

FIG. 13 shows a graph 1300 comparing elapsed time in a particular content item with similar metrics of other content items, such as best selling works, median selling works, or worst selling works. Here, the elapsed time in the various content items is indicated along a horizontal axis 1302, ranging from time zero to time "T." To allow meaningful comparison between different content items, elapsed time as plotted may be normalized or otherwise adjusted to account for different reading speeds or content items of differing size. A vertical axis 1304 shows access velocity, ranging from zero to high.

A plot 1306, shown as a solid curve, is generated from CAI of a particular content item under analysis that is based on content access events collected from multiple users. The plot 1306 extends from time 0 through time T. A plot 1308, shown as a dotted curve, is generated from CAI of a sample best selling content item. The plot 1308 extends from time 0 through time T, and exhibits a greater overall average velocity than plot 1306, as one might expect from a best seller.

A plot 1310 generated from CAI of a sample median selling content item is shown with an alternating long and short dashed curve. The plot 1310 extends from time 0 through time T and exhibits a somewhat lower overall average velocity than as compared to the particular content item's plot 1306.

A plot 1312 generated from CAI of a sample worst selling content item is shown with a dash-dot curve. The plot 1312 extends from time 0 through time T and exhibits a dramatically lower overall average velocity as compared with the other plots 1306-1310.

An analyst (e.g., author, publisher, marketer, etc.) may use this graph to determine the performance of a content item relative to other content items. In this graph, it is clear that the item under analysis does not reach the status of a "best seller" but does offer an overall performance above the median and worst samples. Such an analysis may be useful for pre-launches, to gauge how well the content item will do or whether changes need to be made while still in pre-launch to ensure a better reception.

Figure 14:
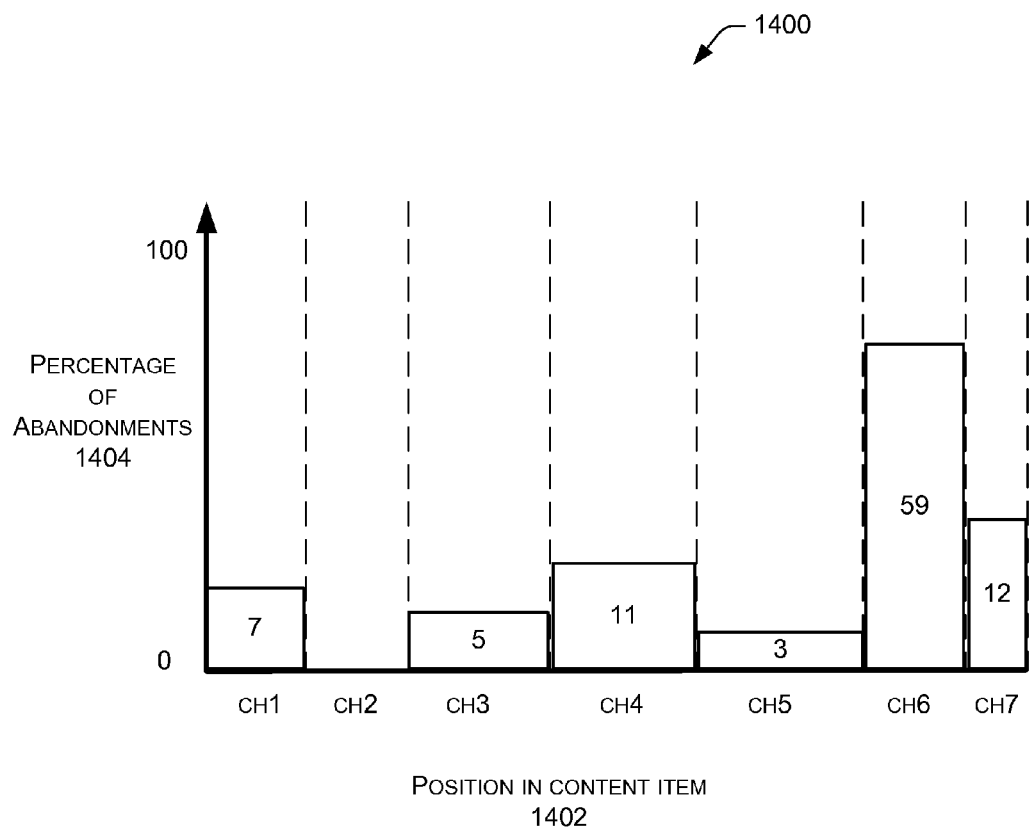
FIG. 14 shows a graph of position in a content item versus percentage of abandonments, generated from content access information.

FIG. 14 shows a graph 1400 that plots position in a single content item versus percentage of abandonments generated from content access information derived across multiple users who consumed the content item. Position in the content item is indicated along a horizontal axis 1402, ranging from chapter 1 through chapter 7. A vertical axis 1404 shows a percentage of abandonments, ranging from zero to 100%.

In this graph, the percentage of abandonments for this content item range from 0% for chapter 2, meaning that no user abandoned the item in chapter 2, to 59% abandonment for chapter 6 and 12% abandonment for chapter 7. Referring to the plot of FIG. 9, a correlation between the drastic drops in reading velocity for chapter 6 and 7 and the high abandonment rates becomes apparent. Thus, in this example, the users found chapters 6 and 7 less interesting to read, and more of the users abandoned the content item in these chapters.

Abandonment reports may also be adjusted to address education settings where specific chapters are assigned and others skipped, to avoid incorrectly classifying a chapter as abandoned. In such situations, access by users of chapters not assigned may be considered significant as well in determining abandonment. For example, if the chapter immediately before an abandoned chapter was not assigned, but was accessed, it may indicate that users were attempting to better comprehend the material in the abandoned chapter.

Generating Abandonment Information

Further analysis of content access information (CAI) may lead to additional insight into consumption of content items. As discussed next, this additional analysis results in greater understanding of how users progress through content items, as well as abandonment patterns and probabilities. While described in the context of reading an electronic book, the progress data and abandonment information may be applied more generally to any content item.

Figure 15:
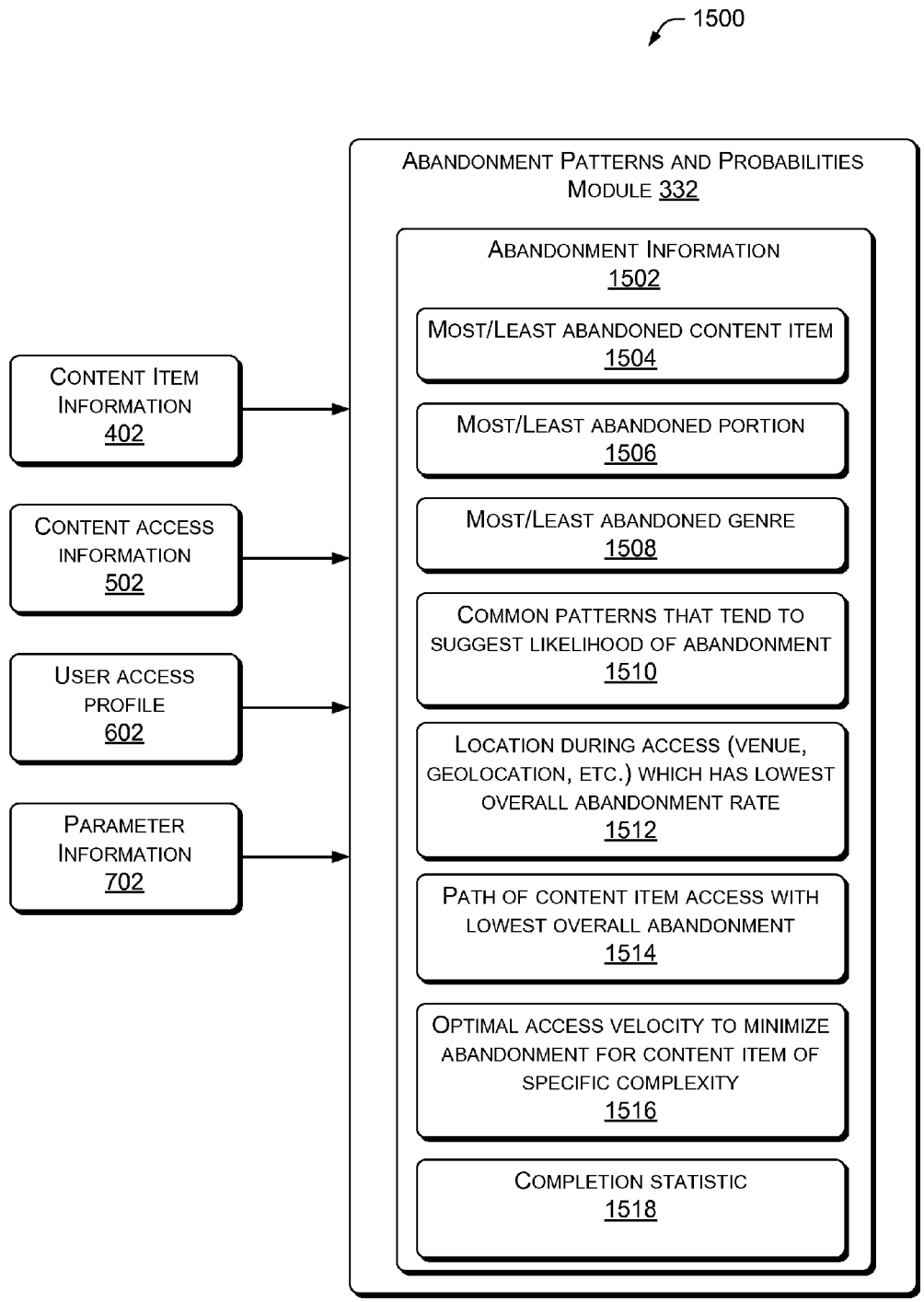
FIG. 15 shows an illustrative abandonment patterns and probabilities module of FIG. 3, and possible abandonment statistics which may be generated.

FIG. 15 shows the abandonment patterns and probabilities module 332 that resides on the servers 122(1)-(S) as part of the data collection and recommendation service 124 as shown in FIG. 3, and possible abandonment information which may be generated from content access information. Various combinations of content item information 402, content access information 502, user access profile data 602, and parameter information 702 may be used by abandonment patterns and probabilities module 332 to generate abandonment information 1502. From this information and data, the module 332 computes a wide variety of statistics. The following list provides an example set of abandonment information 1502 that may be produced:

Most/least abandoned content items 1504. Here the module 332 identifies those content items that are most and least abandoned by users given certain parameters. Further filters may be used, such as genre, type, sales data, publisher, etc. For example, the module 332 may compute the most/least abandoned non-fiction book title which has sold over 100,000 copies.

Most/least abandoned portion 1506 of a content item, rather than the whole item. For example, the module 332 determines which chapter of a particular book is abandoned with the greatest frequency, or at what point in all currently available fiction books users are most likely to abandon the work.

Most/least abandoned genre 1508. For example, the module 332 may ascertain which genre is abandoned most or least frequently, and whether this changes during different times of the year, or at different locations.

Common patterns that tend to suggest likelihood of abandonment 1510. For example, the module 332 may analyze patterns as users progress through a work against eventual abandonment data to assess whether certain patterns anticipate abandonment.

A location during access which has the lowest overall abandonment rate 1512. As one example, the module may determine whether users who read textbooks in a library have a lower abandonment rate than those who read textbooks in a dorm.

A path of content item access with lowest overall abandonment 1514. This statistic identifies which of the various ways of consuming a content item results in the lowest abandonment by users. For example, users who read a book in a non-sequential order of sections 1, 3, 4, 6, 2, 5, may have a significantly lower abandonment rate than users who read the sections sequentially from 1 to 6. This information may alternatively be expressed as the path of content item access with highest overall abandonment.

An optimal access velocity to minimize abandonment for a content item of specific complexity 1516. For example, it may be determined that in a particular work such as a legal treatise, an optimal access velocity of two pages per minute results in the lowest abandonment rates. As with many of the abandonment statistics discussed, this abandonment statistic may apply to a specific user, to a group of users, or to all users.

A completion statistic 1518, which indicates an estimation of a user's progress in accessing the content item. This statistic 1518 may be expressed as a Boolean value (e.g., finished/not-finished), a percentage completion (e.g., 90% finished), or in other ways.

Determining Abandonment

Figure 16:
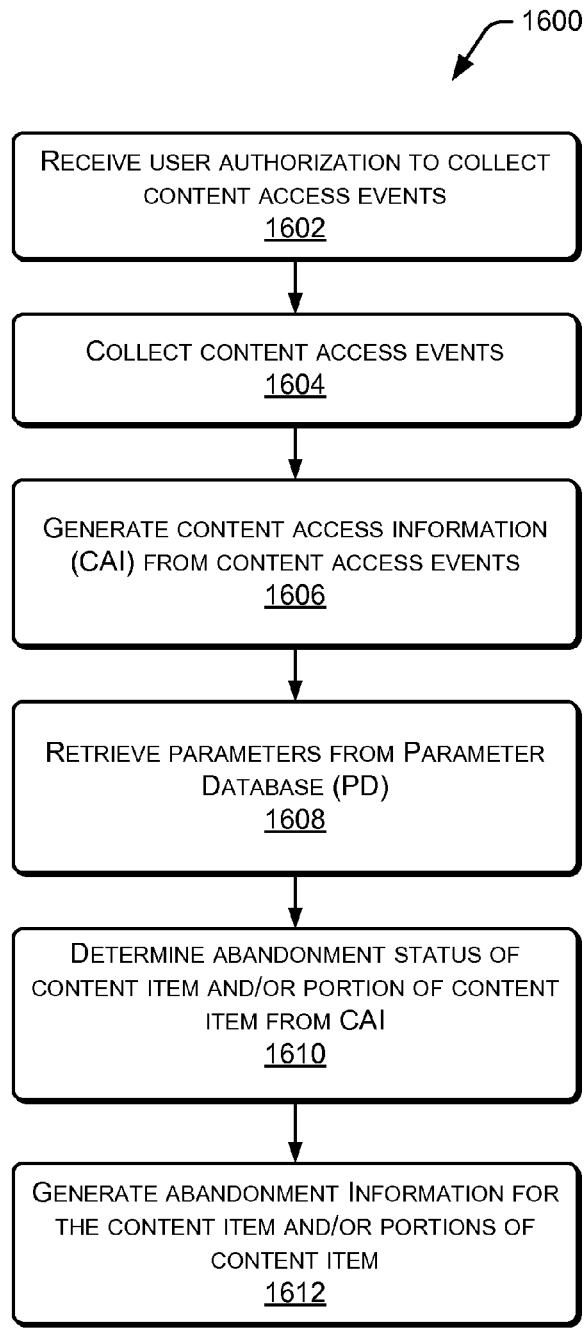
FIG. 16 is a flow diagram of an illustrative process of generating abandonment information based on content access information generated from content access events gathered by access devices.

FIG. 16 shows an illustrative process 1600 of collecting data indicative of user progress through content items and generating abandonment information for the content items. The process 1600 (as well as processes 1610, 1716, and 1900 in FIGS. 17-19) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process will be described in the context of the architecture of FIGS. 1-7.

At 1602, there is an initial receipt of user authorization to collect content access events (CAEs) as the user accesses content items using the access devices 104(1)-(N). This authorization may be granted in many ways, including both implicit and explicit techniques. As one example, a user may be presented with, and explicitly agree to, terms of use when acquiring rights to access a content item that include authorization to collect CAE data.

At 1604, the CAEs are collected. In one implementation, the CAEs are captured by, and stored at, the access device 104, as shown in FIG. 2. Once captured, the CAE data may be transferred to the data collection and recommendation service (DCRS) 124 over the network 120. Alternatively, if access devices are accessing the content items via the servers 122(1)-(S), the DCRS 124 residing on the servers 122(1)-(S) may directly collect CAEs. The type and number of CAEs collected are configurable parameters.

At 1606, content access information (CAI) is generated from the CAEs. As an example, suppose an access device 104 collects CAEs in the form of as identification of a content item and a timestamp of each presentation of that content item to the user. These CAEs may then be consolidated into CAI that defines a frequency-of-access statistic for a particular content item. There are many other ways to derive content access information from a collection of CAEs.

At 1608, parameters from parameter database 314 are retrieved and used to determine whether a content item has been abandoned. The parameters may be in the form of threshold, name-value pairs, or other types, and may be static or dynamically adjusted.

At 1610, abandonment status of a content item and/or portions of that content item are determined using the CAI for a given set of parameters. For instance, where a content item has not been accessed for several months, the abandonment status may be set to "abandoned." This determination may be based in part on user-specific considerations that can impact how assessments of abandonment are made. For instance, some readers never access the back matter of an eBook (i.e., bibliography, notes, index, reader group questions, etc.) whereas other readers do routinely. As a result, when the first class of readers reach the "last" page of non-back-matter text and stop, the process may conclude that these readers are finished. However, for the second class of readers, the process may determine them to have abandoned the book if they reach this "last" page and stop. This is described in more detail next in FIG. 17.

At 1612, abandonment information for the content item and/or portions of the content item may be generated. The abandonment information, such as that described above with respect to FIG. 15, includes usage patterns suggestive of abandonment and probabilities. The information may be generated based progress data, abandonment status, and other CAI. Users may view abandonment information, and/or CAI, and/or CAE, as they wish.

Figure 17:
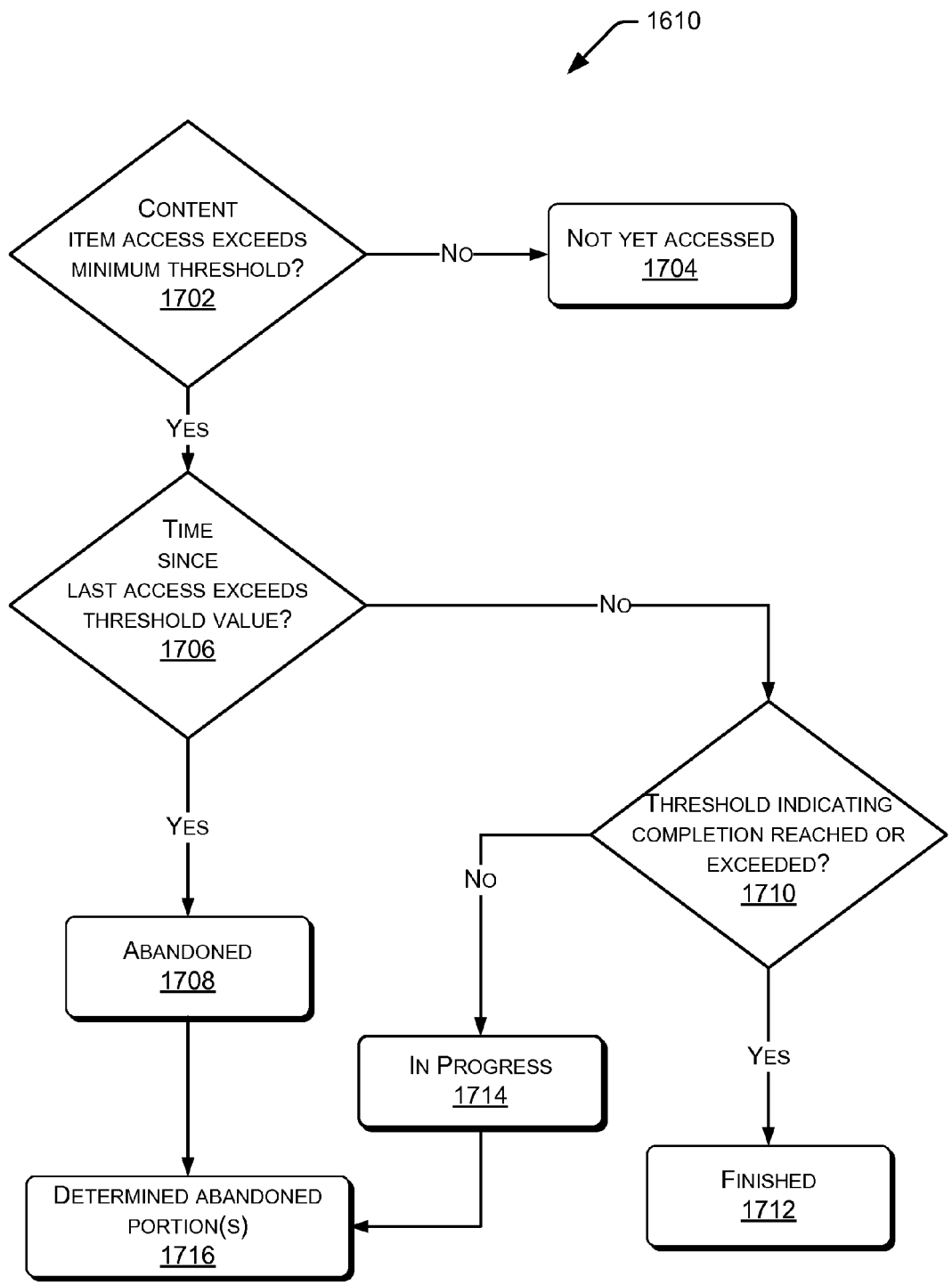
FIG. 17 is a flow diagram of an illustrative process of determining abandonment status of a content item and/or a portion of a content item based on content access information.

FIG. 17 shows one example process 1610 of determining abandonment status of a content item and/or a portion of a content item based on content access information, as provided in FIG. 16. The process 1610 may, but need not, be implemented using the architecture shown in FIGS. 1-7. For discussion purposes, the process will be described in the context of the architecture of FIGS. 1-7.

At 1702, a determination is made as to whether the content item has yet been accessed. In one implementation, this determination is made by comparing a parameter indicative of access with a minimum access threshold 736 maintained in the parameter database 314 (FIG. 7). For instance, a number of accesses may be counted or an access time may be monitored, and then compared to a threshold count or time. When the access count, access time, or other parameter indicating that the user has engaged the content item does not exceed a minimum access threshold (i.e., the "No" branch from 1702), the content item is deemed to have not yet been accessed. Hence, it is assigned an abandonment status of "not yet accessed" at 1704. The minimum access threshold 736 is set to a value that seeks to minimize consideration of inadvertently accessed content, such as when a user accidentally selects an unintended content item, while still capturing when the user first intentionally engages the content item. For example, the minimum access threshold may be set such that a content item is deemed "accessed" when it has been opened more than twice, or opened for more than some unit of time (e.g., 20 or more seconds), or similar indicia.

When the content item has exceeded the access minimum threshold (i.e., the "Yes" branch from 1702), a determination is made as to whether the user has recently engaged the content item at 1706. In one implementation, this determination may be made based on a time interval since the user last accessed the content item. This time interval may then be compared with another time threshold 712, which is a threshold of elapsed time since the last user access. This threshold may also be maintained in the parameter database 314. The thresholds may be set, or alternatively learned automatically over time, allowing the thresholds to be different for various content items. For instance, in one implementation, the mean time between content accesses based on aggregate behavior data may be analyzed, and then the threshold may be expressed in terms of the standard deviation from this mean. When the interval exceeds this second time threshold (i.e., the "Yes" branch from 1706), the user has been away from the content item for sufficient time for the system to deem the content item as being abandoned. Thus, at 1708, the abandonment status is set to "abandoned."

Otherwise, if the user has accessed the content item before the time interval reaches the second time threshold (i.e., the "No" branch from 1706), the user may or may not have abandoned the content item. The user may still be consuming the content item, may have abandoned some portions of the content item while continuing to consume other portions, or perhaps may have completed the content item.

At 1710, a determination is made as to whether a threshold indicating completion of the content item has been reached. The completion threshold may be established in many ways. For instance, completion may be inferred from the user activity relative to the content item, as compared to a threshold for that activity. The activity may be time-based or access-based. As one example, suppose the completion threshold parameter 730 in the parameter 314 for an electronic book is set to 90% of pages viewed. When the user reaches or exceeds that threshold (e.g., viewing 95% of the pages), the content item can be considered completed. Other techniques for inferring completion may include, for example, an overall time period spent in the content item, a finding that all portions of the content item have been accessed, and the elapse of a sufficient time period since the user last accessed the content item after the content item had been previously accessed some threshold amount.

Thus, if the completion threshold is reached or exceeded (i.e., the "Yes" branch from 1710), the abandonment status is set to "finished" at 1712. Otherwise, if the content threshold is not reached (i.e., the "No" branch from 1710), the content item may be deemed to still be in progress and is assigned an abandonment status of "in progress" at 1714.

At 1716, content items with abandonment statuses of "abandoned" or "in progress" may be further analyzed to determine whether particular portions of the content item were abandoned, and if so, where did actual abandonment point(s) occur. This is discussed in more detail next with regards to FIG. 18.

In other implementations, other thresholds, comparisons, and combinations of both may be used. For example, a content item may be considered as abandoned when a user flips through all of the pages at greater than their typical access velocity, fast forwards through tracks, etc. Thresholds may also differ by user. For example, one user may have a threshold indicating completion 730 set greater than another user.

Figure 18:
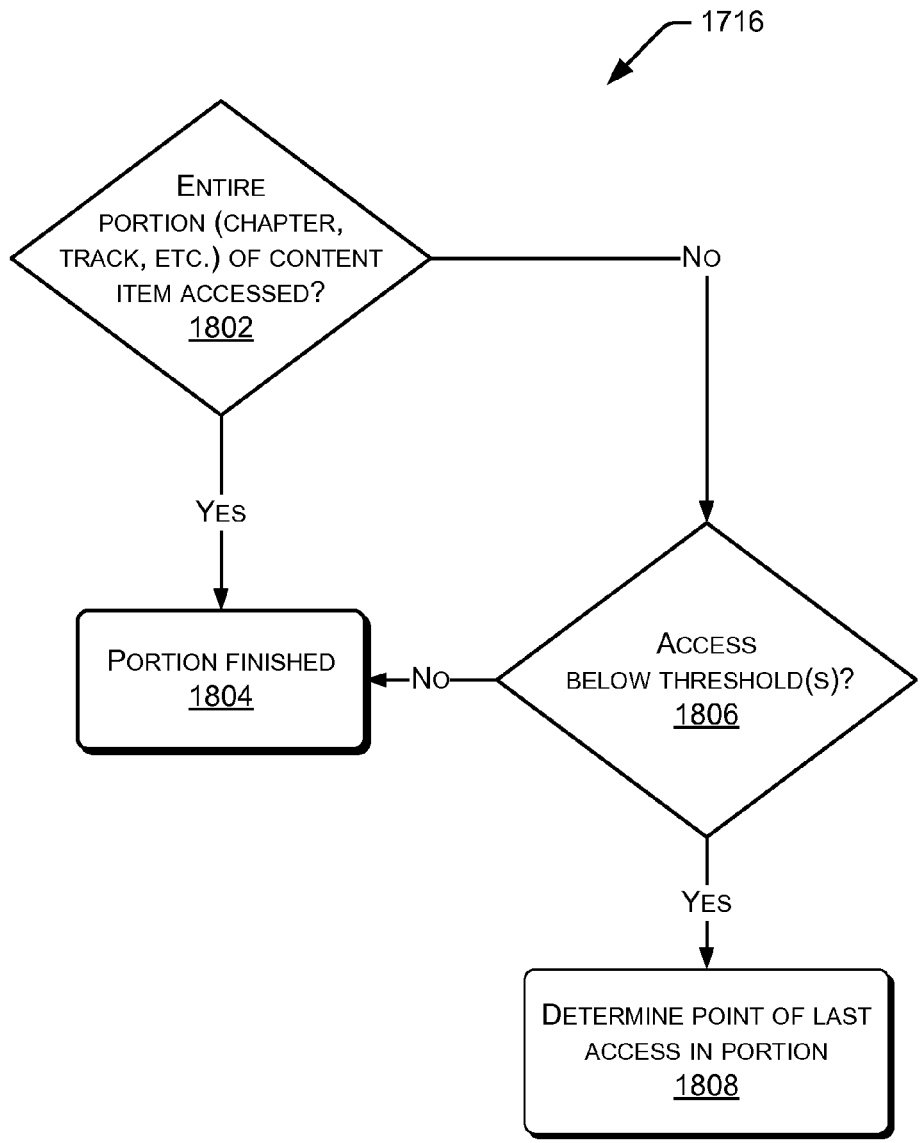
FIG. 18 is a flow diagram of an illustrative process of determining abandonment of a portion of a content item.

FIG. 18 shows one example process 1716 of determining abandonment of a portion of a content item based on content access information, as shown in FIG. 17. The process 1716 will be described in the context of the architecture of FIGS. 1-7, but it need not be implemented using this architecture.

At 1802, a determination is made as to when an entire portion (e.g., chapter, track, selection, scene, etc.) of a content item 108 has been accessed. When an entire portion has been accessed (i.e., the "Yes" branch from 1802), the portion is deemed to have an abandonment status of "finished" at 1804. It is noted that in other implementations, other determinations may be used to ascertain whether a content portion is finished. For instance, the process may determine whether access velocity went to zero before an endpoint of the portion, or whether the content item 108 has been removed from the local memory 204 of the access device, or other similar indicia.

When an entire portion has not been accessed (i.e., the "No" branch from 1802), another determination is made as to whether the user has recently engaged the content item, which is based in this implementation on whether access has fallen below some threshold level at 1806. The threshold level may be set as a parameter stored in the parameter database 314, and may be expressed in terms of access velocity, time since last access, and so forth. When access falls below the threshold indicating that the user has not recently engaged the content item (i.e., the "yes" branch from 1806), the portion of the content item may be deemed to have an abandonment status of "abandoned" and the last point of access may be stored as the abandonment point for that portion at 1808. As an example, suppose the threshold is an access velocity expressed as a minimum three pages per minute which must be maintained during consumption of the content item for the content item to be finished. Even if the user struggles through the entire portion, a point at which her access velocity dropped below three pages per minute would be deemed an abandonment point.

When access remains above the threshold (i.e., the "No" branch from 1806), the portion may be deemed at 1804 to have an abandonment status of "finished." For example, a user who managed to stay above the three pages per minute threshold and consume the entire portion would be deemed to have completed the portion.

Generating Recommendations Based on Abandonment Information

Once abandonment information has been determined as described above, it becomes possible to make recommendations to users based on the abandonment information. These recommendations may be made for entire content items, portions of content items, or combinations thereof.

Figure 19:
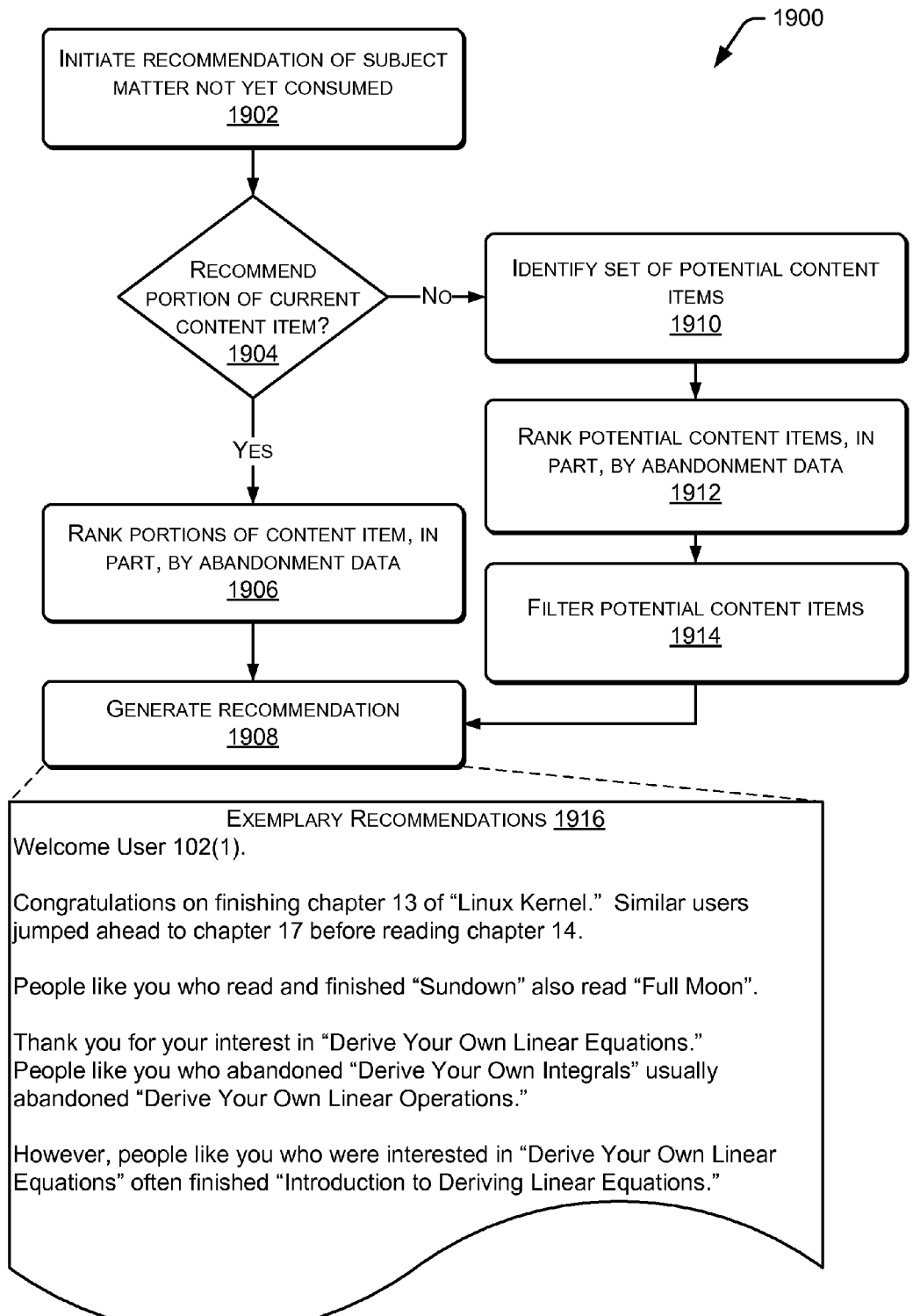
FIG. 19 is a flow diagram of an illustrative process of generating recommendations for content items based on abandonment information.

FIG. 19 shows an illustrative process 1900 of generating recommendations for content items based on abandonment information. For discussion purposes, the process 1900 will be described in the context of the architecture of FIGS. 1-7.

At 1902, a recommendation of subject matter not yet consumed is initiated. There are various ways to make recommendations. In one implementation, recommendations may be based on what sample users, who are similar to an accessing user, are consuming. These sample users may be actual users such as entities, individuals, automated processes, etc., or synthesized composites. Synthesized composites may derive from a plurality of actual users. Similarity between users may be determined, for example, by identifying sample users who have user access profiles and demographics that are within a threshold of the accessing user. If the threshold is being within five years of the same educational level, a sample user with a Doctorate degree may be considered similar to an accessing user with a Masters degree but dissimilar to a user with an Associate's degree. Alternatively, similarity may be determined using characteristics such as age, location of residence, preferred genre, preferred complexity, and so on.

In another implementation, recommendations may be based on user behavior. For instance, if the accessing user has abandoned certain content items in the past, then identifying others who have abandoned or completed the same items and proposing other content items enjoyed by them may form the basis for the recommendations. Recommendations may further be initiated by considering item-based collaborative filtering, user histories (purchase, viewing, sampling, etc.), or people-based or item-based clustering techniques.

Per decision 904, recommendations may be made for portions within a current content item (e.g., recommending certain chapters of a book, or select scenes in a movie), or for an entirely different content item or portions thereof (e.g., recommending other books or chapters in other books, or other movies or scenes in other movies). When recommendations for a portion of a current content item are selected (i.e., the "Yes" branch from 1904), portions of the current content item are ranked, at least in part, by abandonment data at 1906. For example, chapters which are less frequently abandoned may be ranked higher than those chapters which are most frequently abandoned. While abandonment data are a factor, they may not be the only factor. Other factors may include user preference, user behavior, and so on.

At 1908, a recommendation is generated. For example, the user may be presented with a recommendation list including the least abandoned, and potentially most relevant, portions as described below in more detail.

When recommendations are made for another content item (i.e., the "No" branch from 1904), a set of potential content items are identified at 1910. The potential content items may be those that were accessed by sample users who are deemed to be similar to the accessing user. Alternatively, the potential items may be items found to be similar to the content item just consumed by the accessing user.

At 1912, potential content items are ranked, at least in part, by abandonment data. For example, content items which are less frequently abandoned may be ranked higher than those content items which are most frequently abandoned. Once again, abandonment data may only be one of the factors in ranking potential content items. Other factors may include user preference, user behavior, past viewing history, past purchase history, and so on.

At 1914, the set of potential content items may be filtered. Various filters may be applied to narrow the list of potential content items. One filter may be based on the preferences of the accessing user. For example, the user access profile may indicate that a user does not prefer horror books, and so these would be removed from the set of potential content items. Another filter may be based on items already completed or purchased by the user. Still another filter may be to exclude items that have high abandonment metrics. The filters may be explicit, such as the user specifying preferences, or implied, such as inferred over time from past history (e.g., a user never buys a horror book even though such books are recommended).

At 1908, the recommendation may be generated as described above, with the understanding that the recommendations may be for whole content items, portions of potential content items, or combinations of the two. As an example of a recommendation, suppose the user 102(1) finishes chapter 13 of the book titled, "Linux Kernel." The process 1900 then determines that other similar users who finish chapter 13 of this book jump ahead to chapter 17 before reading chapter 14. This may result in a recommendation to the user 102(1) to jump ahead to read chapter 17, as shown as the first item in the exemplary recommendations list 1916.

As another example, suppose the user 102(1) has finished the book "Sundown". Upon completion, the process 1900 may produce the recommendation that other users who read and finished "Sundown" also read "Full Moon", as shown by the second item on the list 1916.

Recommendations may also suggest against consumption of a content item, and/or alternate content items as shown by third item in the list 1916. For example, suppose user 102(1) is considering buying the book "Derive Your Own Linear Operations." The user 102(1) may receive the recommendation that other similar users who abandoned "Derive Your Own Integrals" also did not finish "Derive Your Own Linear Operations." Furthermore, the user 102(1) may then receive further recommendations for other books similar to "Derive Your Own Linear Operations" but which were finished by similar users, such as "Introduction to Deriving Linear Equations," as represented by the last item on this list 1916.

Alternately, recommendations may be made without reference to any user other than the accessing user. For example, when the complexity of chapter 14 in the book "Linux Kernel" exceeds a preferred level for the accessing user, as stored in the user access profile, a recommendation to skip the chapter may be issued.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method comprising:
under control of one or more computer systems configured with executable instructions,
collecting, by the one or more computer systems via a network, content access events from an electronic device, the content access events indicative of content consumption within a content item having multiple portions;
generating, by the one or more computer systems, content access information from the content access events;
determining, by the one or more computer systems, an abandonment status of the content item, wherein the abandonment status indicates at least one portion of the content item as abandoned based at least in part on an elapsed time since the at least one portion has been accessed being greater than a threshold time for abandonment;

generating, by the one or more computer systems, abandonment information based at least in part on the abandonment status and the content access information;

generating, using the abandonment information, a recommendation associated with the content item or another content item; and causing the recommendation to be displayed on the electronic device.

2. The method of claim 1, wherein:
the electronic device comprises an electronic book reader; and
the collecting comprises receiving the content access events from one or more electronic book readers including the electronic book reader.

3. The method of claim 1, wherein the generating content access information comprises analyzing access velocity in the content item relative to an elapsed time since last access of the content item.

4. The method of claim 1, wherein the generating content access information comprises analyzing access velocity in the content item relative to a position in the content item.

5. The method of claim 1, wherein the generating content access information comprises analyzing total access duration of the content item measured across different time periods.

6. The method of claim 1, wherein the generating content access information comprises analyzing total access duration of the content item measured by position in the content item.

7. The method of claim 1, wherein the determining the abandonment status comprises ascertaining a status for another portion of the content item, wherein the status for the another portion is selected from a set of statuses including (1) not yet started consuming the another portion of the content item, (2) in progress of consuming the another portion of the content item, (3) completion of the another portion of the content item, and (4) abandonment of the another portion of the content item prior to completion.

8. The method of claim 1, further comprising determining an abandonment status of an additional content item based at least in part on an elapsed time since the additional content item has been accessed being greater than the threshold time for abandonment.

9. The method of claim 1, further comprising inferring that an additional portion of the content item has been completed from one of a time-based metric or an access-based metric.

10. The method of claim 1, further comprising receiving, from the electronic device, authorization to collect the content access events generated by the electronic device during access of the content item.

11. The method of claim 1, further comprising providing, to the electronic device, the recommendation, wherein the recommendation includes at least one of a recommendation to access another portion of the content item or a recommendation for at least a second content item.

12. The method of claim 1, wherein the abandonment information further includes information indicating at least one of a most or least abandoned content item from among multiple content items, a most or least abandoned content item portion from among multiple content item portions, a most or least abandoned content item genre from among multiple content item genres, an access path of the content item which provides a lowest or highest overall abandonment rate from among multiple access paths, or an optimal access velocity to minimize abandonment for the content item from among multiple access velocities.

13. The method of claim 1, further comprising providing, to another electronic device, the recommendation, wherein the recommendation includes at least one of a recommendation to access a portion of the content item or a recommendation to access the another content item.

14. The method of claim 1, further comprising:
determining that the electronic device and another electronic device both accessed an additional content item; and
providing, to the another electronic device, the recommendation, wherein the recommendation includes a recommendation to access the content item.

15. The method of claim 1, further comprising:
ranking, based at least in part on the abandonment information, the content item against at least an additional content item,
and wherein the recommendation is further based at least in part on the ranking.

16. A method comprising:
determining content access information describing access of a content item using an electronic access device associated with a user;
detecting, based on the content access information, that an access velocity for a first portion of the content item decreases as compared to an additional access velocity of a second portion of the content item;
identifying, based at least in part on the detecting, the first portion as a location in the content item that the user has exhibited interest in ceasing to consume at least part of the content item;
generating progress data based at least in part on the content access information for the content item, the progress data indicating the first location in portion of the content item where the user has exhibited interest in ceasing to consume the content;
generating, based at least in part on the progress data, a recommendation associated with the content item or another content item; and
causing the recommendation to be displayed on the electronic access device.

17. The method of claim 16, wherein the content item comprises at least one of an electronic book, digital music, or video.

18. The method of claim 16, wherein the electronic access device comprises an electronic book reader.

19. The method of claim 16, wherein the content item is composed of multiple portions, where individual portions comprise at least one of a chapter, track, section, page, episode, part, subdivision, interval, or period, and the progress data is indicative of the electronic access device ceasing to access one or more portions of the content item.

20. The method of claim 16, wherein the generating the progress data comprises:
accessing one or more parameters from a parameter database; and
comparing the content access information with the one or more parameters from the parameter database.

21. The method of claim 20, wherein the one or more parameters are dynamically modifiable.

22. The method of claim 16, wherein the progress data comprises abandonment data including one of a percentage of user abandonment of the content item or a percentage of user abandonment of one or more portions of the content item.

23. The method of claim 16, further comprising generating an abandonment status for the content item based at least in part on the content access information of the content item.

24. The method of claim 23, wherein the abandonment status is selected from a set of statuses comprising finished, in progress, and abandoned.

25. The method of claim 23, further comprising providing the electronic access device with the recommendation, wherein the recommendation comprises at least one of a recommendation for a third portion of the content item to access or a recommendation for a second content item.

26. A non-transitory computer-readable storage media storing computer-readable instructions that, when executed, instruct a processor to perform acts comprising:
  determining that a content item has been accessed using an electronic access device;
  determining that the content item is no longer in-progress of being accessed on the electronic access device;
  determining that the content item has been abandoned based at least in part on user behavioral data, the user behavioral data indicating at least one portion of content items that is accessed using the electronic access device in order for the content items to be classified as finished;
  generating, based at least in part on the determining that the content item has been abandoned, abandonment information for the content item;
  generating, using the abandonment information, a recommendation associated with the content item or another content item; and
  causing the recommendation to be displayed on the electronic access device.

27. The non-transitory computer-readable storage media of claim 26, wherein the determining of that the content item has been accessed comprises monitoring when access to the content item exceeds an access threshold.

28. The non-transitory computer-readable storage media of claim 26, wherein the determining that the content item is no longer in-progress of being accessed comprises comparing a time since the content item was last accessed on the electronic access device to a time threshold, the content item being deemed to be no longer in-progress based at least in part on the time exceeding the time threshold.

29. The non-transitory computer-readable storage media of claim 28, wherein the recommendation comprises a recommendation for a second content item.

30. The non-transitory computer-readable storage media of claim 26, wherein the determining that the content item is no longer in-progress of being accessed comprises evaluating frequency of access to the content item on the electronic access device, wherein the content item being deemed to be no longer in-progress based at least in part on the frequency falling below a threshold.

31. The non-transitory computer-readable storage media of claim 26, further comprising displaying, on the electronic access device, a list of the content items organized according to whether the content items are not yet accessed, in-progress, abandoned, or finished.

32. A system comprising:
  a processor;
  a memory accessible by the processor;
  a collection module stored in the memory and executable on the processor to collect content access events from an electronic book reader pertaining to access of a content item using the electronic book reader;
  a statistics module stored in the memory and executable on the processor to generate content access information from the content access events collected by the collection module;
  an abandonment module stored in the memory and executable on the processor to:
    determine abandonment information about the content item based at least in part on the content access information;
    determine that an abandonment status, of the content item is abandoned based at least in part on the content access information indicating that the content item was accessed less than a particular number of times for a particular time period using the electronic book reader; and
    determine, based at least in part on the content access information, a probability that indicates a likelihood that the content item will be abandoned by a user that consumes the content item using an additional electronic book reader; and
  an interface module stored in the memory and executable on the processor to provide the probability to the additional electronic book reader, wherein providing the probability causes the probability to be displayed on the additional electronic book reader.

33. The system of claim 32, wherein the content access information comprises a time since the electronic book reader last accessed the content item, and wherein the abandonment status is further based on the time exceeding a threshold time value.

34. The system of claim 32, wherein the abandonment status is further based on access velocity as measured against one of position in the content item and elapsed time in the content item.

35. The system of claim 32, wherein the interface module presents a list of multiple content items that is at least partially organized according to the abandonment status.

* * * * *